US011885878B2

(12) United States Patent
McLeod

(10) Patent No.: US 11,885,878 B2
(45) Date of Patent: *Jan. 30, 2024

(54) METHOD FOR GATING AN OUTPUT OF A SINGLE PHOTON AVALANCHE DIODE (SPAD) CLUSTER BASED ON AN AMBIENT COUNT OF AMBIENT LIGHT EVENTS GENERATED BY THE SPAD CLUSTER IN A REGION OF INTEREST OF A TIME OF FLIGHT (TOF) RANGING ARRAY

(71) Applicant: STMICROELECTRONICS (RESEARCH & DEVELOPMENT) LIMITED, Marlow (GB)

(72) Inventor: Stuart McLeod, Edinburgh (GB)

(73) Assignee: STMICROELECTRONICS (RESEARCH & DEVELOPMENT) LIMITED, Marlow (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/952,540

(22) Filed: Sep. 26, 2022

(65) Prior Publication Data
US 2023/0009376 A1 Jan. 12, 2023

Related U.S. Application Data

(63) Continuation of application No. 16/722,923, filed on Dec. 20, 2019, now Pat. No. 11,500,092.

(51) Int. Cl.
*G01S 7/486* (2020.01)
*G01S 17/18* (2020.01)
*G01S 7/484* (2006.01)
*G01S 7/4863* (2020.01)

(52) U.S. Cl.
CPC .............. *G01S 17/18* (2020.01); *G01S 7/484* (2013.01); *G01S 7/4863* (2013.01); *G01S 7/4868* (2013.01)

(58) Field of Classification Search
CPC . G01S 7/38; G01S 17/02; G01S 17/04; G01S 17/06; G01S 17/10; G01S 17/89; G01S 7/49; G01S 7/486; G01S 7/487; G04F 10/00; G04F 10/04; H01L 31/02; H01L 31/107
USPC .................... 250/214 R, 214 AB, 214 AL
See application file for complete search history.

(56) References Cited

U.S. PATENT DOCUMENTS

| | | |
|---|---|---|
| 6,678,039 B2 | 1/2004 | Charbon |
| 9,639,063 B2 | 5/2017 | Dutton et al. |
| 10,739,189 B2 | 8/2020 | Pacala et al. |
| 2015/0036005 A1 | 2/2015 | Kelly et al. |
| 2016/0033644 A1 | 2/2016 | Moore |
| 2016/0284743 A1 | 9/2016 | Mellot et al. |
| 2017/0115381 A1 | 4/2017 | Moore et al. |
| 2018/0253404 A1 | 9/2018 | Moore et al. |

(Continued)

*Primary Examiner* — Que Tan Le
(74) *Attorney, Agent, or Firm* — Slater Matsil, LLP

(57) ABSTRACT

In an embodiments, a method for operating a time-of-flight (ToF) ranging array includes: illuminating a field-of-view (FoV) of the ToF ranging array with radiation pulses; receiving reflected radiation pulses with a plurality of single photon avalanche diodes (SPADs) in a region of interest (ROI) of the ToF ranging array, the plurality of SPADs arranged in a plurality of SPAD clusters; determining an ambient count of ambient light events generated by SPADs of a first SPAD cluster of the plurality of SPAD clusters; and gating an output of the first SPAD cluster based on the ambient count.

20 Claims, 17 Drawing Sheets

(56) References Cited

U.S. PATENT DOCUMENTS

| | | |
|---|---|---|
| 2019/0109977 A1 | 4/2019 | Dutton et al. |
| 2019/0230304 A1 | 7/2019 | Moore et al. |
| 2019/0271767 A1 | 9/2019 | Keilaf et al. |
| 2020/0158836 A1* | 5/2020 | Henderson .............. G01S 17/89 |

* cited by examiner

METHOD FOR GATING AN OUTPUT OF A SINGLE PHOTON AVALANCHE DIODE (SPAD) CLUSTER BASED ON AN AMBIENT COUNT OF AMBIENT LIGHT EVENTS GENERATED BY THE SPAD CLUSTER IN A REGION OF INTEREST OF A TIME OF FLIGHT (TOF) RANGING ARRAY

CROSS-REFERENCE TO RELATED APPLICATIONS

This application is a continuation of U.S. application Ser. No. 16/722,923, filed on Dec. 20, 2019, which application is hereby incorporated herein by reference.

TECHNICAL FIELD

The present disclosure relates generally to an electronic system and method, and, in particular embodiments, to a method for operating a time-of-flight (ToF) ranging array, corresponding circuit and device.

BACKGROUND

Devices for determining the distance (range) to objects (targets) are known. One currently used method is called time-of-flight (ToF). This method comprises sending a light signal towards the object and measuring the time taken by the signal to travel to the object and back. The calculation of the time taken by the signal for this travel may be obtained by measuring the phase shift between the signal coming out of the light source and the signal reflected from the object and detected by a light sensor. Knowing this phase shift and the speed of light enables the determination of the distance to the object.

Single photon avalanche diodes (SPADs) may be used as a detector of reflected light. In general, an array of SPADs is used as a sensor in order to detect a reflected light pulse. A photon may generate a carrier in the SPAD through the photo electric effect. The photo generated carrier may trigger an avalanche current in one or more of the SPADs in a SPAD array. The avalanche current may signal an event, namely that a photon of light has been detected.

Light detection and ranging (LIDAR), also called LADAR, is an application that uses ToF techniques to detect the presence of objects and its associated distance from a source.

A proximity sensor may benefit from ToF techniques. Proximity sensors detect the presence of nearby objects without physical contact.

Another application that may benefit from ToF techniques is autofocus (AF) for cameras.

SUMMARY

In accordance with an embodiment, a method for operating a time-of-flight (ToF) ranging array, the method including: illuminating a field-of-view (FoV) of the ToF ranging array with radiation pulses; receiving reflected radiation pulses with a plurality of single photon avalanche diodes (SPADs) in a region of interest (ROI) of the ToF ranging array, the plurality of SPADs arranged in a plurality of SPAD clusters; determining an ambient count of ambient light events generated by SPADs of a first SPAD cluster of the plurality of SPAD clusters; and gating an output of the first SPAD cluster based on the ambient count.

In accordance with an embodiment, a ranging circuit including: a plurality of single photon avalanche diode (SPAD) macro-blocks (MBs), each SPAD MB including a respective SPAD cluster and a respective OR tree; a controller coupled to an output of the respective OR tree of each SPAD MB of the plurality of SPAD MBs; and a processor configured to generate a histogram based on an output of one or more SPAD MBs of the plurality of SPAD MBs, where the controller is configured to: determine an ambient count of ambient light events generated by SPADs of a first SPAD cluster of a first SPAD MB of the plurality of SPAD MBs; and gate an output of the first SPAD MB based on the ambient count.

In accordance with an embodiment, a device including: an illuminator circuit configured to illuminate a field-of-view (FoV) of the device with radiation pulses; a time-of-flight (ToF) ranging array including a plurality of single photon avalanche diode (SPAD) macro-blocks (MBs), each SPAD MB including a respective SPAD cluster and a respective OR tree, the ToF ranging array configured to receive reflected radiation pulses; a controller coupled to an output of the respective OR tree of each SPAD MB of the plurality of SPAD MBs; and a processor configured to generate a histogram based on an output of the ToF ranging array, where the controller is configured to: determine an ambient count of ambient light events generated by SPADs of a first SPAD cluster of a first SPAD MB of the plurality of SPAD MBs; and gate an output of the first SPAD MB based on the ambient count.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a ranging device using a ToF ranging array that includes SPADs and uses ToF techniques to determine the range to one or more objects in the FoV of the ranging device. Embodiments of the present invention may be used in applications such as auto-focus (AF), LiDAR, and proximity sensors, for example.

In an embodiment of the present invention, portions of the FoV of a ranging device are excluded from the FoV of the ranging device (e.g., prevented from contributing to the generation of a histogram), e.g., in order to optimize the ranging performed of the ranging device. In some embodiments, SPAD clusters of a programmable ToF ranging array being excited by intense and localized light are prevented from contributing to the histogram used for performing ranging computations. In some embodiments, preventing SPAD clusters from contributing to the histogram generation advantageously prevents saturation of the histogram, thereby advantageously allowing for the enablement of additional SPADs in the other SPAD clusters in the FoV of the ToF ranging array to, e.g., maximize the dynamic range and increase the signal to ambient light ratio. In some embodiments, the excluded SPAD clusters continue to be monitored and may be dynamically re-included in the FoV of the ranging device, e.g., if the intense and localize light moves and/or reduces its intensity.

Figure 1:
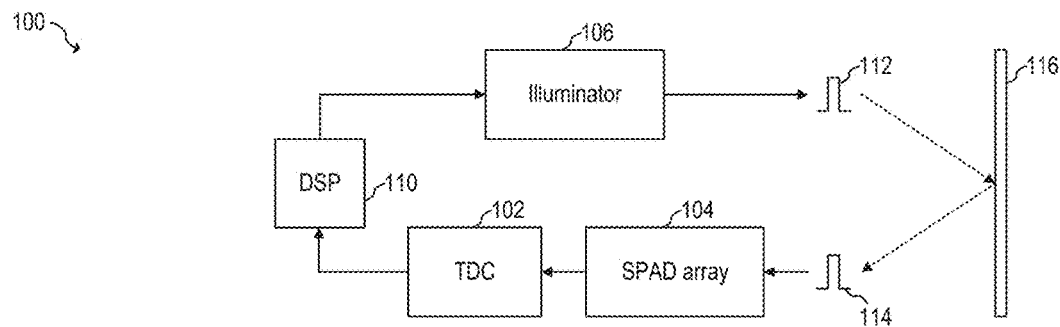
FIG. 1 shows an exemplary ToF imaging system.

Optical ranging devices using ToF techniques rely on detecting returned signal from objects (targets) in their field-of-view (FoV) in order to determine the range of these objects from the ranging device. For example, FIG. 1 shows exemplary ToF imaging system 100. ToF imaging system 100 includes illumination source 106, SPAD array 104 (also referred to as a ToF ranging array), time-to-digital converter (TDC) 102, and digital signal processor (DSP) 110.

During normal operation, illumination source 106 emits radiation pulse 112 (e.g., a light signal) towards object 116. Reflected radiation pulse 114 is sensed by SPAD array 104. TDC 102 generates a digital representation of the time between the emission of radiation pulse 112 and reception of reflected radiation pulse 114. DSP 110 then processes the information data received from TDC 102 to determine the distance to object 116.

Illumination source 106 may be implemented in any way known in the art. For example, illumination source 106 may be implemented as a vertical-cavity surface-emitting laser (VCSEL). Other implementations are also possible.

TDC 102 may be implemented in any way known in the art. For example, TDC 102 may be implemented, e.g., as described in U.S. patent application Ser. No. 15/877,551, filed on Jan. 23, 2018, and entitled "Single Reference Clock Time to Digital Converter," which application is incorporated herein by reference. Other implementations are also possible.

DSP 110 may be implemented in any way known in the art. For example, DSP 110 may be a general purpose DSP, processor or controller that includes, for example, combinatorial circuits coupled to a memory. DSP 110 may also be implemented as a custom application-specific integrated circuit (ASIC). Other implementations are also possible.

To increase accuracy in the ToF measurements, illumination source 106 may emit multiple radiation pulses 112 (e.g., arranged in frames). For example, illumination source 106 may, e.g., emit multiple radiation pulses during a first portion of a frame, and stop emitting radiation pulses during a second portion of the frame. SPAD array 104 may then receive multiple reflected radiation pulses 114. TDC 102 generates digital representation of the times between emission of radiation pulses 112 and reception of radiation pulses 114. DSP 110 then may create a histogram of multiple ToF measurements and determine the distance to object 116 based on the histogram rather than based on a single ToF measurement.

Figure 2:
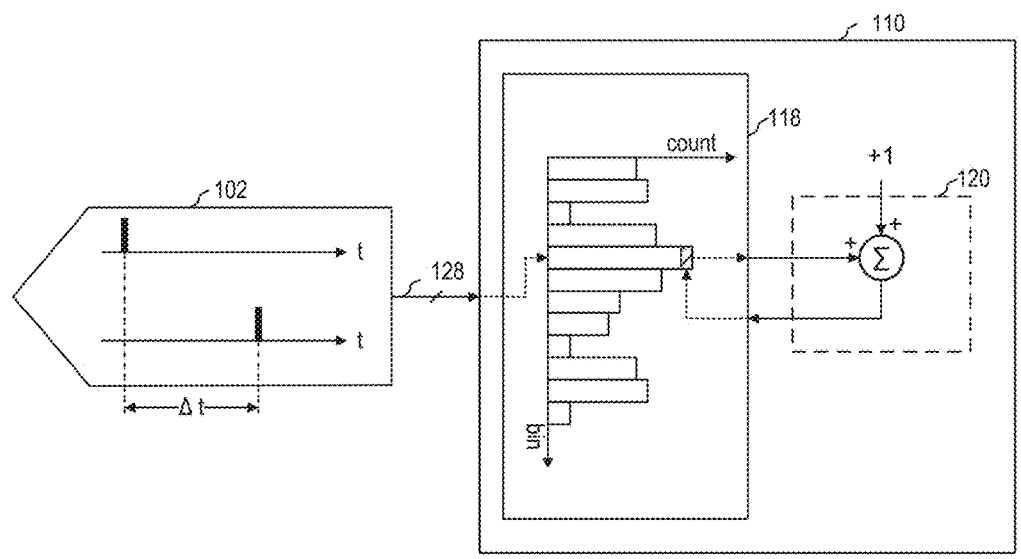
FIG. 2 shows a diagram illustrating an exemplary process of histogram creation based on ToF measurements of the ToF imaging system of FIG. 1.

FIG. 2 shows a diagram illustrating an exemplary process of histogram creation based on ToF measurements of ToF imaging system 100. During normal operation, illumination source 106 emits multiple radiation pulses 112 and SPAD array 104 receives multiple reflected radiation pulses 114. For each emitted radiation pulse 112, TDC 102 measures the time Δt between emitted radiation pulse 112 and received reflected pulse 114 and sends a digital code 128 based on the time Δt to DSP 110. DSP 110 receives digital code 128 and updates histogram 118 by using accumulator 120 and incrementing (e.g., by +1) the bin in the histogram associated with code 128.

Figure 3:
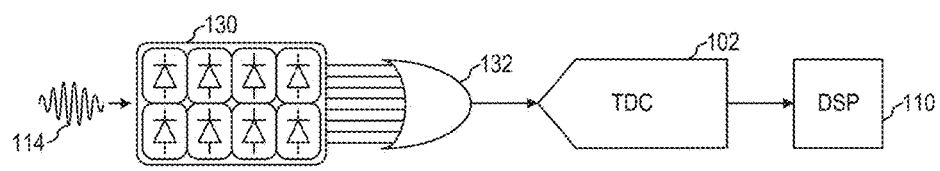
FIG. 3 shows an exemplary implementation of an OR tree in the ToF imaging system of FIG. 1.

Some imaging systems may be implemented with one TDC per SPAD in the SPAD array 104. In other words, an imaging system having a SPAD array 104 of 16 SPADs may be implemented with 16 TDCs, where the DSP generates a histogram per TDC and/or a single histogram for all the TDCs. However, some systems may reduce the number of TDCs by using an OR tree. FIG. 3 shows an exemplary implementation of OR tree 132 in ToF imaging system 100. As shown in FIG. 3, SPAD cluster 130 includes 8 SPADs, where each of the 8 SPADs is connected to OR tree 132. Although SPAD cluster 130 is shown to have 8 SPADs, SPAD cluster 130 may have a different number of SPADs such as 4 or 16, for example.

During normal operation, reflected radiation pulse 114 stimulates one or more of the SPADs of SPAD cluster 130. Each time one or more SPADs of SPAD cluster 130 is stimulated, the output of OR tree 132 is asserted. TDC 102 interprets each time radiation pulse 112 is emitted as a start event and each time the output of OR tree 132 is asserted as a stop event, where the time Δt is the time between the start event and the stop event.

Figure 4:
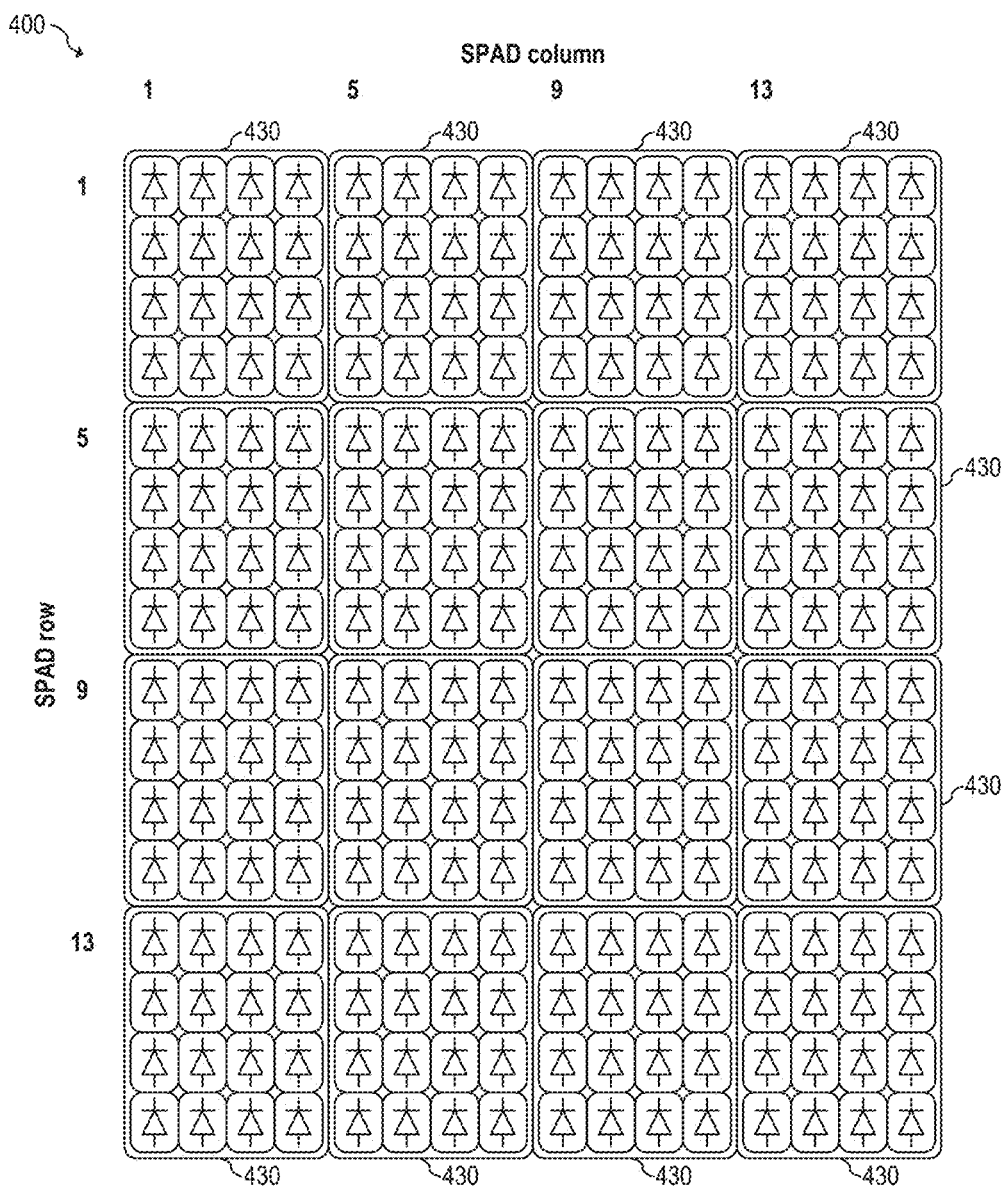
FIG. 4 shows a SPAD array that includes 16 SPAD clusters arranged in 4 rows and 4 columns, where each SPAD cluster includes 16 SPADS arranged in 4 rows and 4 columns.

A SPAD array may include a plurality of SPAD clusters. For example, FIG. 4 shows SPAD array 400 including 16 SPAD clusters 430 arranged in 4 rows and 4 columns, where each SPAD cluster 430 includes 16 SPADS arranged in 4 rows and 4 columns (some of SPAD clusters 430 have not been labeled in FIG. 4 for clarity purposes). Each of the 16 SPAD clusters 430 covers a portion of the FoV of SPAD array 400. In some embodiments, SPAD array 400 may be a portion of a larger SPAD array. SPAD array 400 operates in a similar manner as SPAD array 104.

The ranging performance, of an optical ranging device, in terms of target detection and corresponding range uncertainty, may be degraded by ambient light. For example, ambient light may stimulate one or more SPADs in SPAD cluster 130, thereby causing the output of OR tree 132 to assert even though no reflected radiation pulse 114 has been received.

In a ranging device, such as a lensed ranging device, some ambient light sources may appear as a uniform ambient level (a substantially uniform number of events per bin in the histogram) across the whole FoV of the device (ambient light causes each SPAD cluster 130 to output a substantially similar number of events). If the ambient light source is too intense, it may cause each OR tree 132 to become saturated and miss events.

Figure 5:
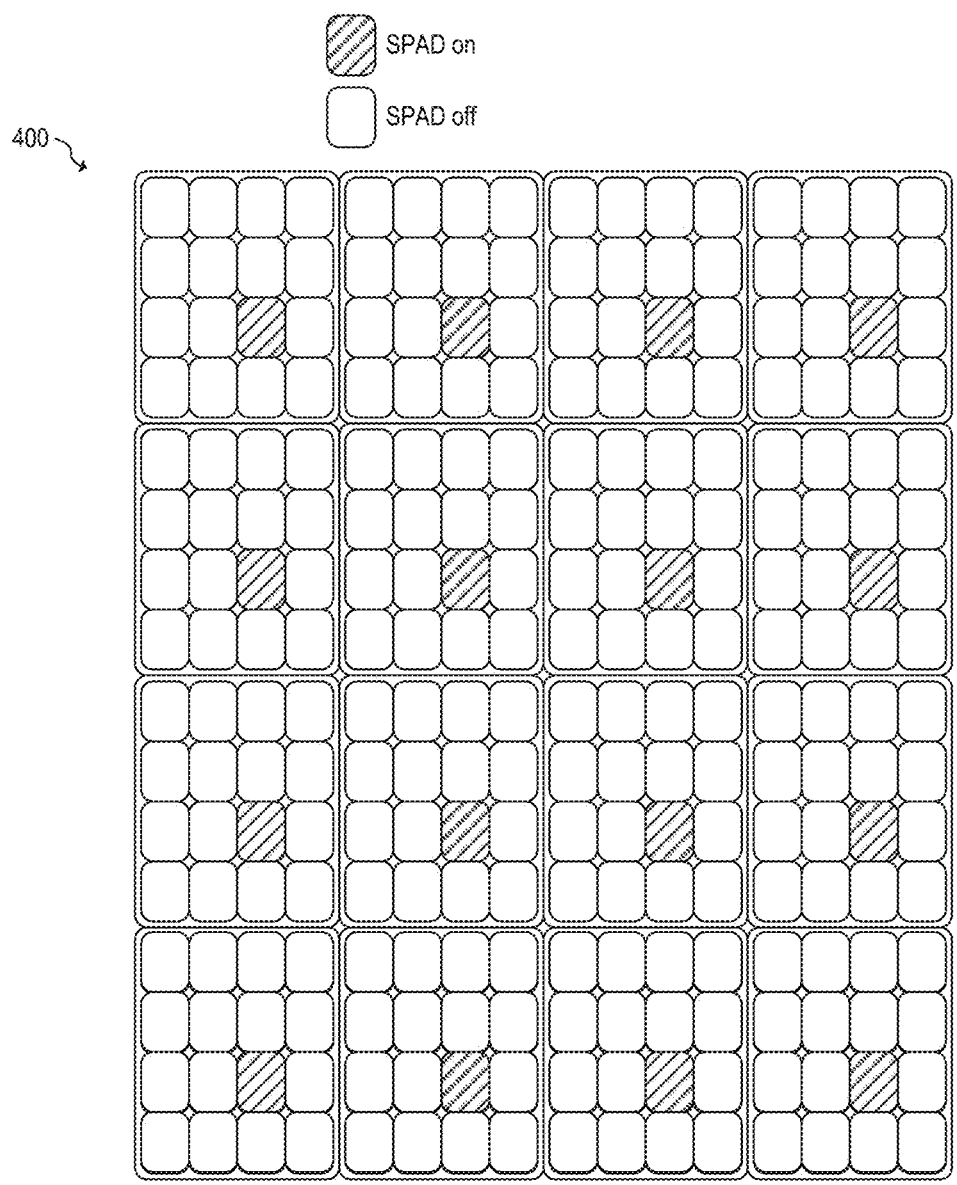
FIG. 5 shows the SPAD array of FIG. 4 having only a single SPAD on in each of the 16 SPAD clusters to avoid saturation due to the presence of an intense light source.

To avoid saturation of the OR tree, one or more SPADs of each SPAD cluster 130 may be (dynamically) turned off (e.g., each frame), thereby reducing the number of assertions of the output of OR tree 132. Dynamic SPAD selection (DSS) may be performed, e.g., as described in U.S. patent application Ser. No. 15/886,353, filed on Feb. 1, 2018, and entitled "Method and Apparatus for Processing a Histogram Output from a Detector Sensor," which application is incorporated herein by reference. For example, FIG. 5 shows SPAD array 400 having only a single SPAD on in each of the 16 SPAD clusters 430 to avoid saturation due to the presence of an intense light source (not shown) in its FoV.

Figure 6A:
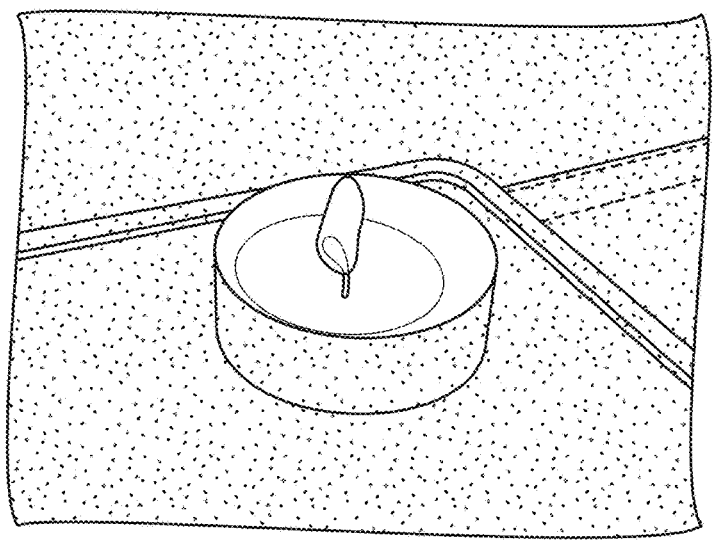
FIGS. 6A-6C show a candle, corresponding SPAD map, and corresponding SPAD array response, respectively.

Some ambient light sources may appear as a structured or localized ambient level occupying only part of the FoV of the SPAD array. For example, FIGS. 6A-6C show candle 602, corresponding SPAD map 604, and corresponding SPAD array response 606, respectively, where the SPAD array is implemented in a ranging device with 60 degrees of FoV.

Figure 6B:
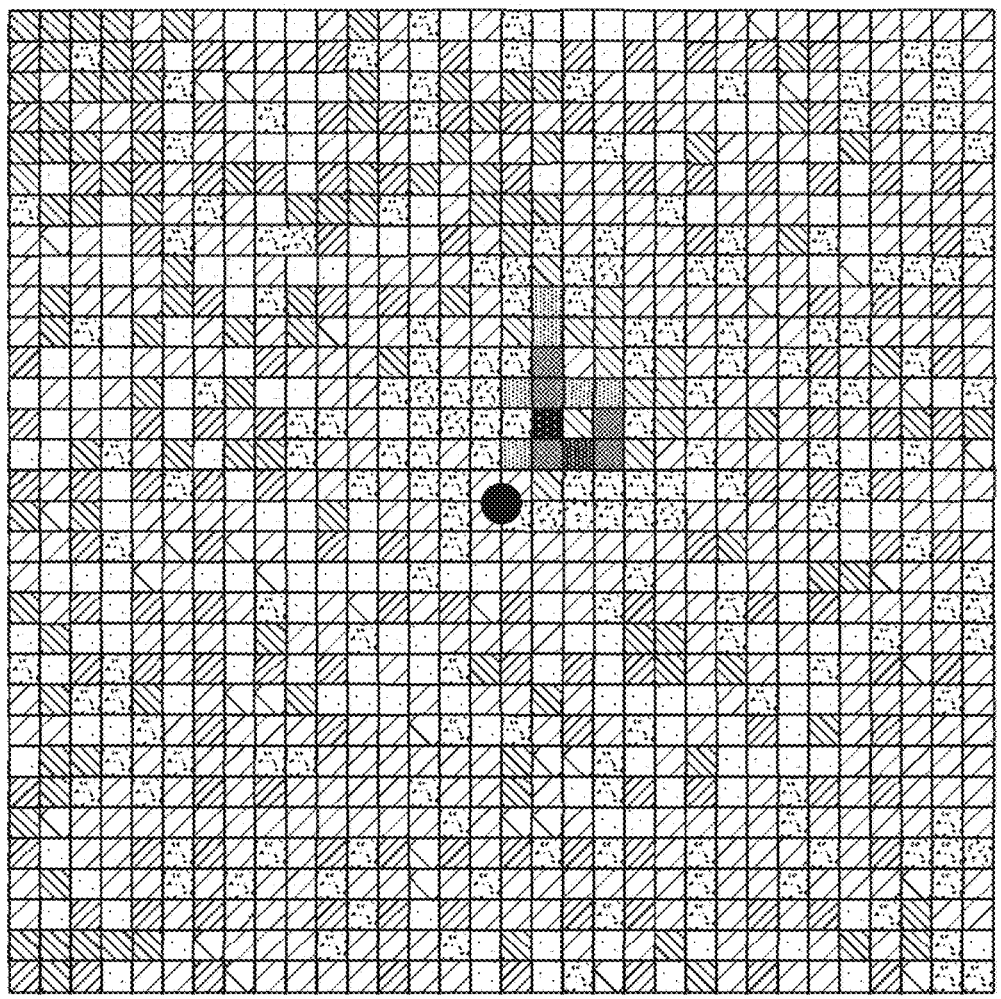
Figure 6C:
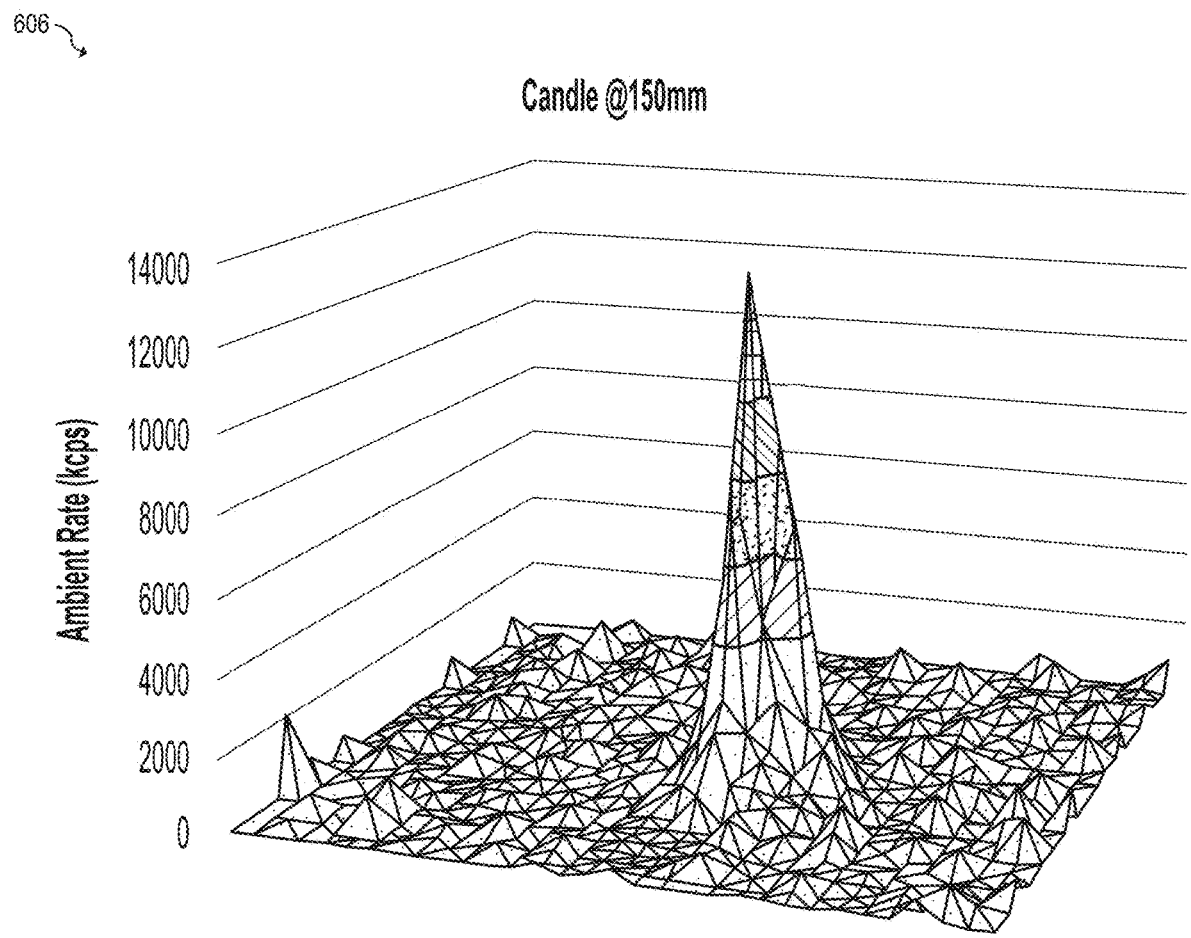

As shown in FIGS. 6B and 6C, the SPAD response to the presence of an intense and localized light source, such as candle 602, is also localized. As shown in FIG. 6C, although the number of events generated by ambient light is generally low, the peak number of events generated by candle 602 is substantially higher, which may cause the overall number of events of the entire FoV of the SPAD array to saturate the corresponding histogram.

Figure 7A:
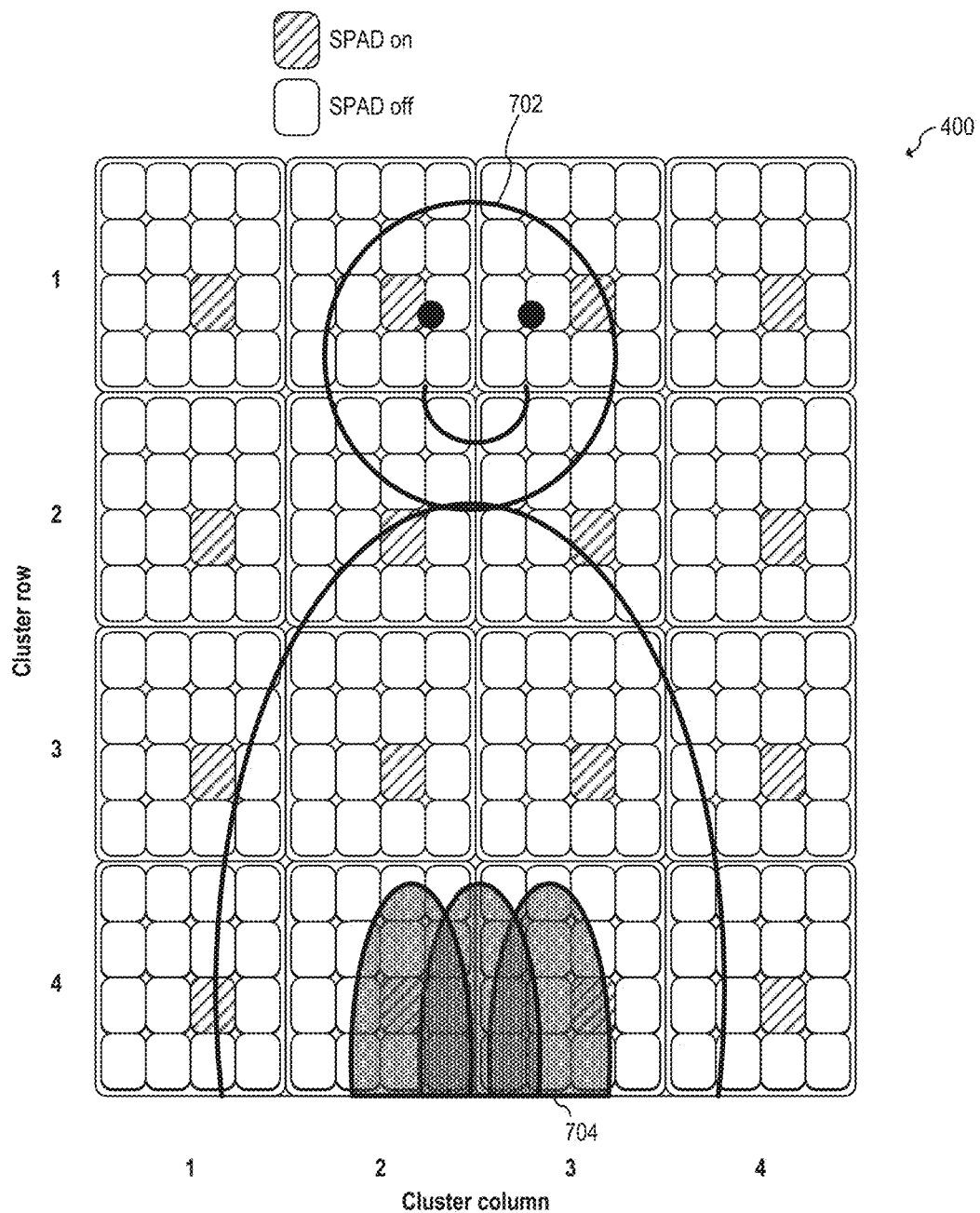
FIGS. 7A and 7B show the SPAD array of FIG. 4 having only a single SPAD on in each of the 16 SPAD clusters and in the presence of an intense and localized light source, and corresponding histogram, respectively.

FIG. 7A shows SPAD array 400 having only a single SPAD on in each of the 16 SPAD clusters 430 and in the presence of intense and localized light source 704 in its FoV. Intense and localized light source 704 may be, e.g., a candle, the sun, a light bulb, etc.

Intense and localized light source 704 may cause the total number of events generated by the output of OR tree 132 of each cluster to saturate the corresponding histogram. As a result, in the example of FIG. 7A, a single SPAD per cluster 430 is turned on (e.g., by performing DSS) to avoid or reduce the risk of saturation of the histogram.

Figure 7B:
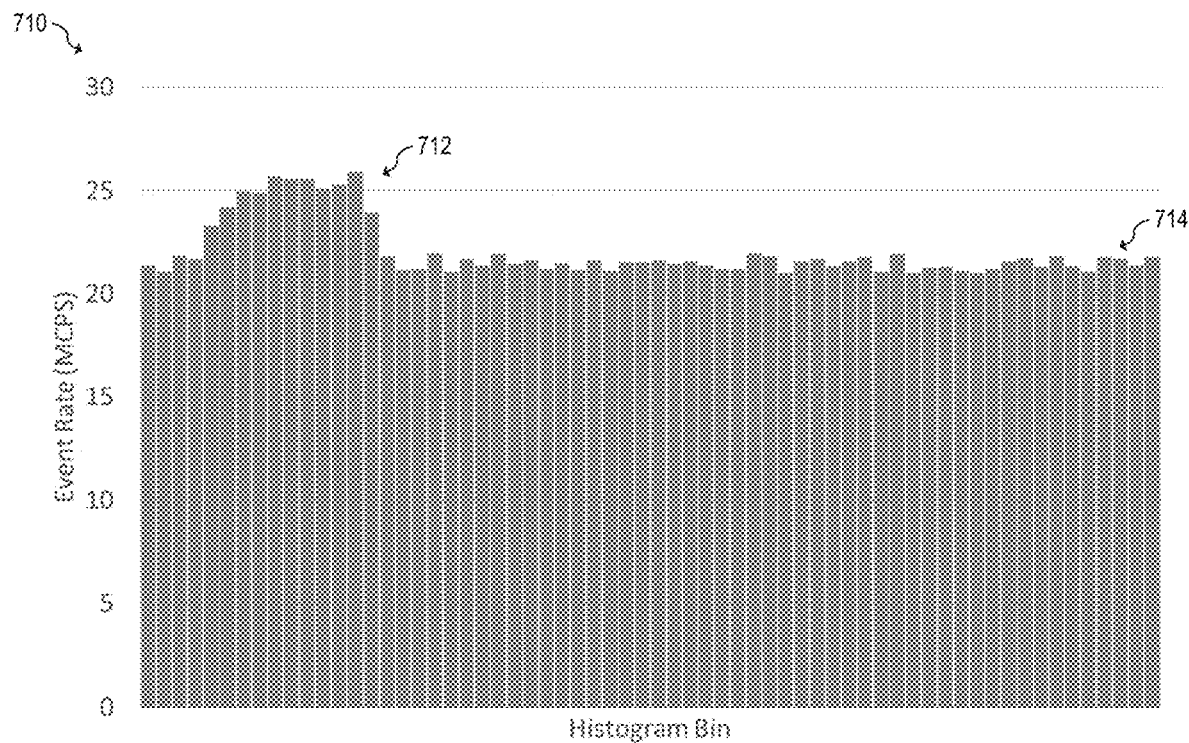

FIG. 7B shows histogram 710 corresponding to SPAD array 400 in the presence of intense and localized light source 704 (as shown in FIG. 7A). Histogram 710 includes peak 712, corresponding to target 702, and ambient light level 714. In the example of FIG. 7B, saturation is reached at about 25 million cycles per second (MCPS).

As shown in FIG. 7B, peak 712 of histogram 710 corresponds to events associated with reflected radiation pulses 114 from target 702. The events corresponding to peak 712 are dominated mostly by 6 SPADs (SPADS in columns 2 and 3, rows 1-3, as shown in FIG. 7A). The events of ambient light level 714 are dominated by 2 SPADs (the SPADS in row 4, columns 2 and 3, as shown in FIG. 7A).

As shown in FIG. 7B, histogram 710 exhibits poor signal to ambient ratio (ratio between peak 712 and average ambient light value 714). If the ambient light from intense and localized sources is included into a range determination for a given target, it may severely degrade the ranging device's ability to detect targets and measure range reliably.

In an embodiment of the present invention, SPAD clusters that disproportionately contribute to the increase of the ambient light level and/or reduce the signal to ambient light ratio are excluded from the FoV of the SPAD array, e.g., to minimize the degradation caused by intense and localized ambient light sources.

Figure 8B:
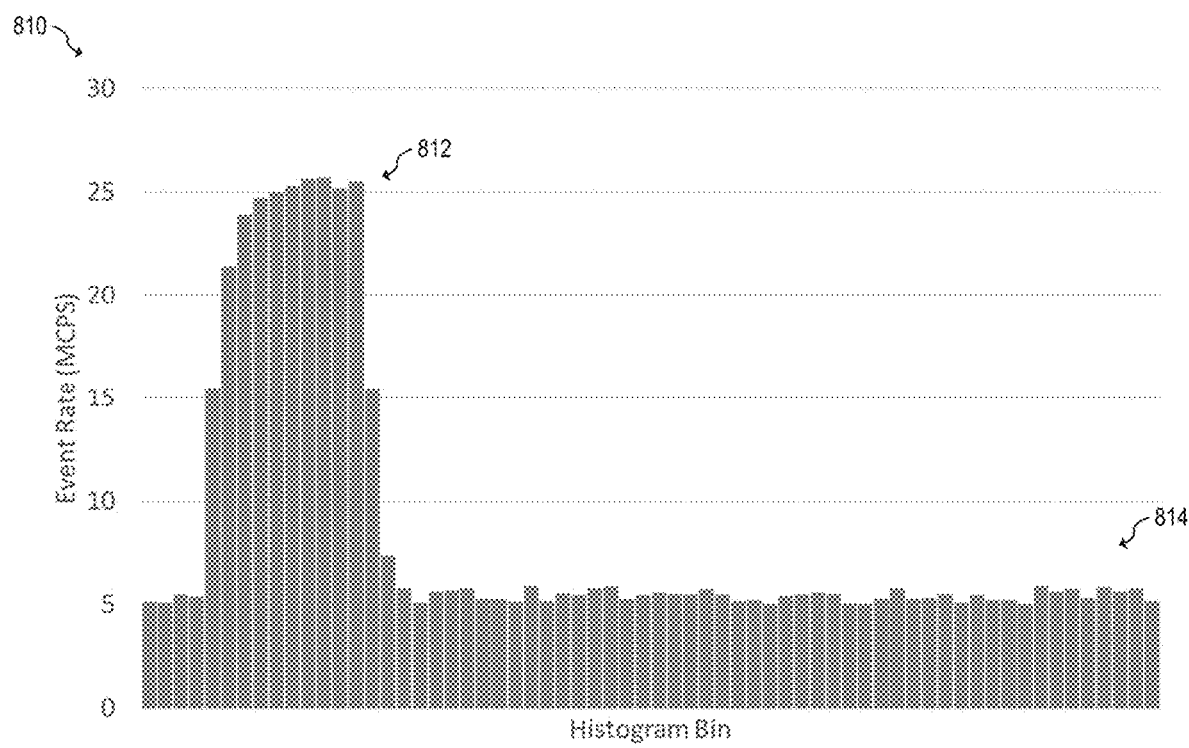
FIGS. 8A and 8B show the SPAD array of FIG. 4 in the presence of an intense and localized light source, and corresponding histogram, respectively, according to an embodiment of the present invention.
Figure 8A:
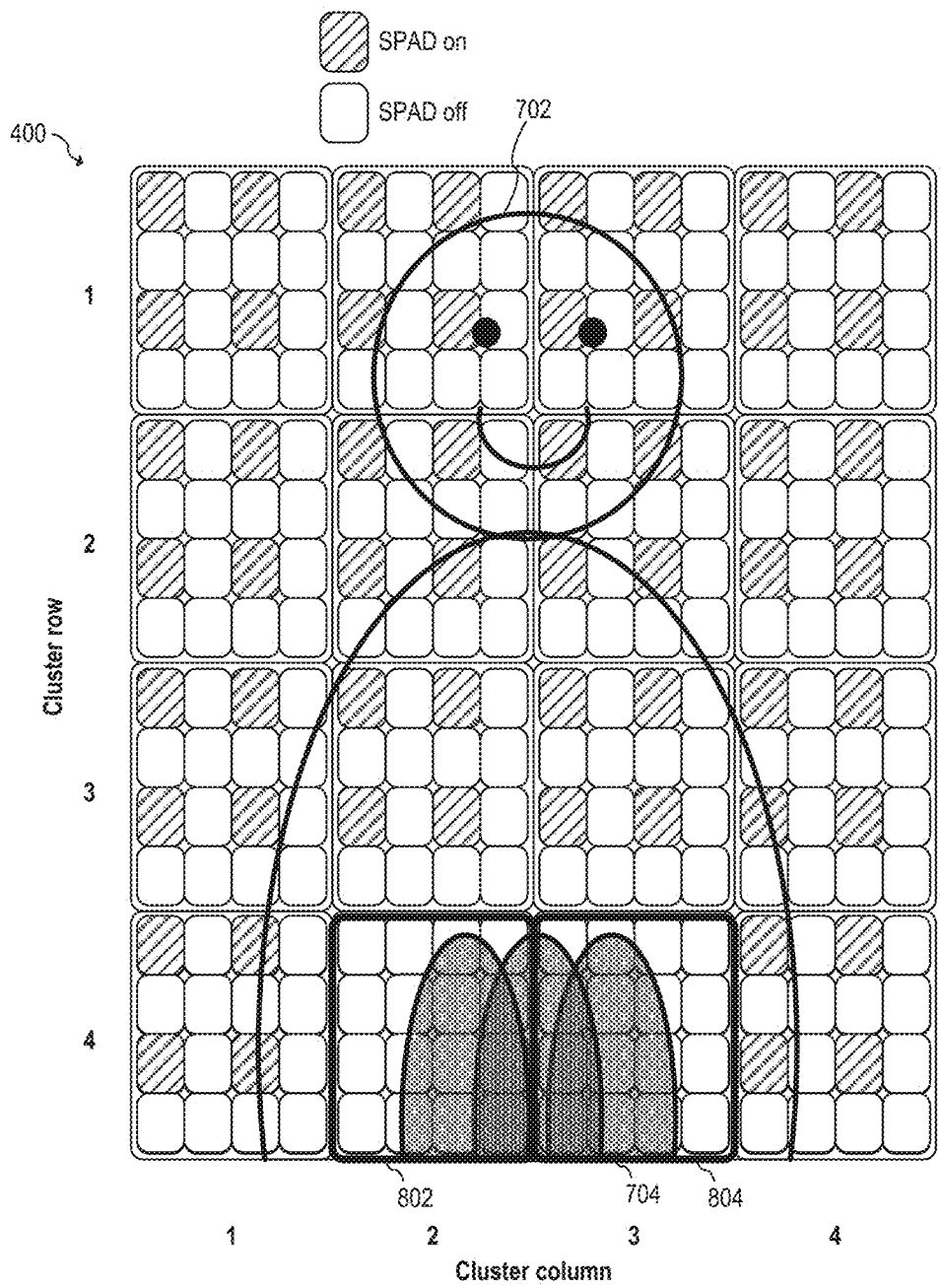

FIGS. 8A and 8B show SPAD array 400 having SPAD clusters exposed to intense and localized light source 704 excluded from the FoV of SPAD array 400, and corresponding histogram 810, respectively, according to an embodiment of the present invention.

As shown in FIG. 8A, intense and localized light source 704 is localized mostly in SPAD clusters 802 and 804, corresponding to row 4, columns 2 and 3. Blocking (preventing) clusters 802 and 804 from contributing events to the generation of the histogram 810 causes the ambient light level to reduce. As a result, more SPADs can be turned on (e.g., by performing DSS) without saturating the OR tree 132. In the example of FIG. 8A, 4 SPADs per SPAD cluster 430 may be enabled using DSS without saturating the OR tree 132 (as reflected in FIG. 8B).

As shown in FIG. 8B, histogram 810 includes peak 812, corresponding to target 702, and ambient light level 814. As shown in FIG. 8B, by excluding clusters 802 and 804 from the generation of events of histogram 810, ambient light level 814 is about 4 times smaller than ambient light level 714, even though 4 SPADs per cluster 430 are used to capture light and generate corresponding events (instead of 1 SPAD per cluster, as shown in FIG. 7A).

In the embodiment of FIG. 8B, saturation is reached at about 25 MCPS. In other embodiments, OR tree saturation may be reached at a number higher than 25 MCPS, such as 30 MCPS, 50 MCPS or higher, or at a number lower than 25 MCPS, such as 20 MCPS, 10 MCPS, or lower.

Similar to FIG. 7B, peak 812 of histogram 810 corresponds to events associated with reflected radiation pulses 114 from target 702. However, since 4 SPADs per cluster are active in the embodiment of FIGS. 8A and 8B, the events corresponding to peak 812 are dominated mostly by 17 SPADs (SPADS in columns 2 and 3, rows 1-3, and column 4, row 4, as shown in FIG. 8A) instead of 6 SPADs (as shown in FIG. 7A). The events of ambient light level 814 are substantially uniformly generated by the 56 SPADs in the unblocked SPAD clusters 430 (all of the SPADs that contribute to the generation of histogram 810).

As shown in FIGS. 7B and 8B, histogram 810 exhibits a signal to ambient light ratio that is about 16 times higher than the signal to ambient light ratio of histogram 710. In some embodiments, the improved signal to ambient light ratio may cause better ranging performance, such as a higher maximum distance that can be measured and better repeatability.

It is understood that, although SPAD array 400 is shown in the Figures as including 256 SPADs in 16 SPAD clusters 430, a different number of SPADs per cluster 430 and a different number of SPAD clusters 430 in the SPAD array 400 may also be used. It is also understood that SPAD array 400 may be a portion of a larger SPAD array. For example, in some embodiments, SPAD array 400 may represent the region of interest (ROI) of a larger SPAD array.

In some embodiments, SPAD clusters 430 may be implemented inside SPAD macro-blocks (MBs), where each SPAD MB, in addition to having a SPAD cluster 430, includes other circuits, such as an OR tree, for example.

In an embodiment of the present invention, a central controller determines, based on the number of events generated by a SPAD MB, whether such SPAD MB should contribute to the generation of a histogram. If the central controller determines that the SPAD MB should not contribute to the generation of the histogram, the output of such SPAD MB is gated. In some embodiments, a monitor circuit that monitors the number of events generated by a SPAD cluster of the blocked SPAD MB continues to report the number of events to the central controller even though the output of the blocked SPAD MB is gated. In some embodiments, continuing to monitor the number of events generated by a blocked SPAD cluster advantageously allows the central controller to unblock (remove the gating) the output of the SPAD MB, e.g., based on the number of events generated by the blocked SPAD cluster.

Figure 9:
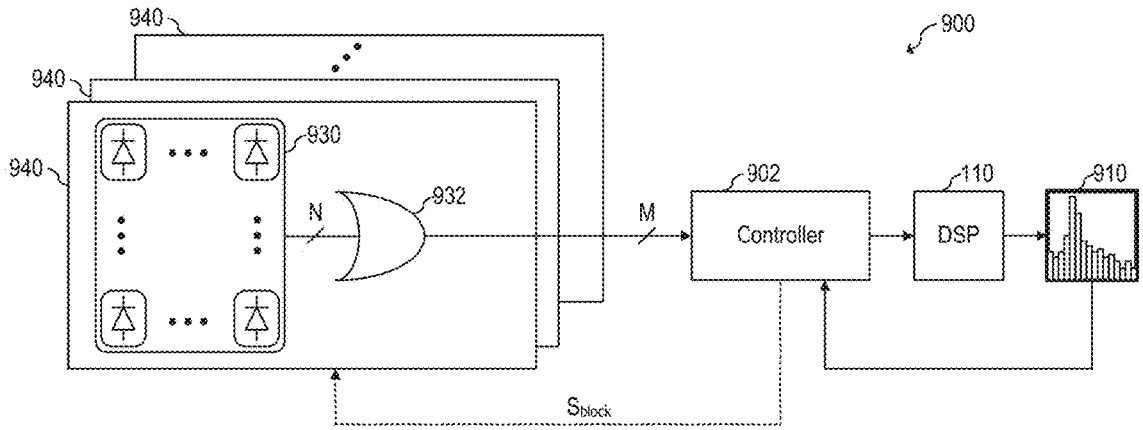
FIG. 9 shows a schematic diagram of a ranging circuit, according to an embodiment of the present invention.

FIG. 9 shows a schematic diagram of ranging circuit 900, according to an embodiment of the present invention. Ranging circuit 900 may be part of a ToF imaging system, such as ToF imaging system 100. Ranging circuit 900 includes M SPAD MBs 940, controller 902, and DSP 110, where M is an integer number greater than 1, such as 8, 12, 16, 20, 32, or other number. Each of the M SPAD MBs include a SPAD cluster 930 and an OR tree 932. Each SPAD cluster 930 includes N SPADs, e.g., arranged in rows and columns, where N is an integer number greater than 1, such as 8, 16, 20, or other number.

During normal operation, SPAD clusters 930 inside each of the SPAD MBs 940 are stimulated by reflected radiation pulses 114 and by ambient light. The outputs of OR trees 932 are asserted each time their corresponding SPAD cluster 930 is stimulated. Controller 902 receives information from the outputs of OR trees 932 (e.g., directly, or via a TDC—not shown) and forwards (e.g., some) information to DSP 110, which generates histogram 910.

Controller 902 receives information from histogram 910 and turns on and off the number of SPADs of SPAD clusters 930, e.g., to avoid saturating OR tree 932 (e.g., by performing DSS). For example, if the current number of SPADs per SPAD cluster is 4, and histogram 910 is saturated, controller 902 then may reduce the number of active SPADs per SPAD cluster 930 to 3 (e.g., for the next frame).

Controller 902 also monitors the number of events generated per SPAD cluster 930. If controller 902 determines that a SPAD cluster 930 is producing a disproportionate number of events compared to the other SPAD clusters 930, the controller 902 may prevent such SPAD cluster 930 from contributing to the generation of histogram 910. For example, in the embodiments of FIGS. 8A and 8B, controller 902 prevents SPAD clusters 802 and 804 from contributing to the generation of histogram 910.

In some embodiments, controller 902 prevents a SPAD cluster 930 from contributing to the generation of histogram 910 by disabling the SPAD cluster 930 (e.g., turning off the SPAD cluster 930 by removing biasing) and/or disabling the SPAD MB 940 (e.g., by removing power from SPAD MB 940), e.g., using signal $S_{block}$. In other embodiments, controller 902 prevents a SPAD cluster 930 from contributing to the generation of histogram 910 by gating the output of OR tree 932 (e.g., by using a hardware circuit), e.g., without turning off the corresponding SPAD cluster 930 and SPAD MB 940. In some embodiments, by keeping the blocked SPAD MB 940 active, controller 902 may continue to monitor the output of such blocked SPAD MB 940 and (dynamically) re-enable such blocked SPAD MB 940 (e.g., during the next frame) if it becomes advantageous to do so (e.g., if the blocked SPAD MB 940 is no longer exposed to an intense and localized light source).

In some embodiments, a portion or all of controller 902 may be implemented as part of DSP 110. For example, if controller 902 is implemented as part of DSP 110, the gating of the output of OR tree 932 may be performed digitally (e.g., by not adding events from such SPAD cluster 930 into histogram 910).

In other embodiments, controller 902 may be implemented in hardware (e.g., by using custom logic). In yet other embodiments, a portion of controller 902 may be implemented in hardware and another portion of controller 902 may be implemented in DSP 110.

Figure 10:
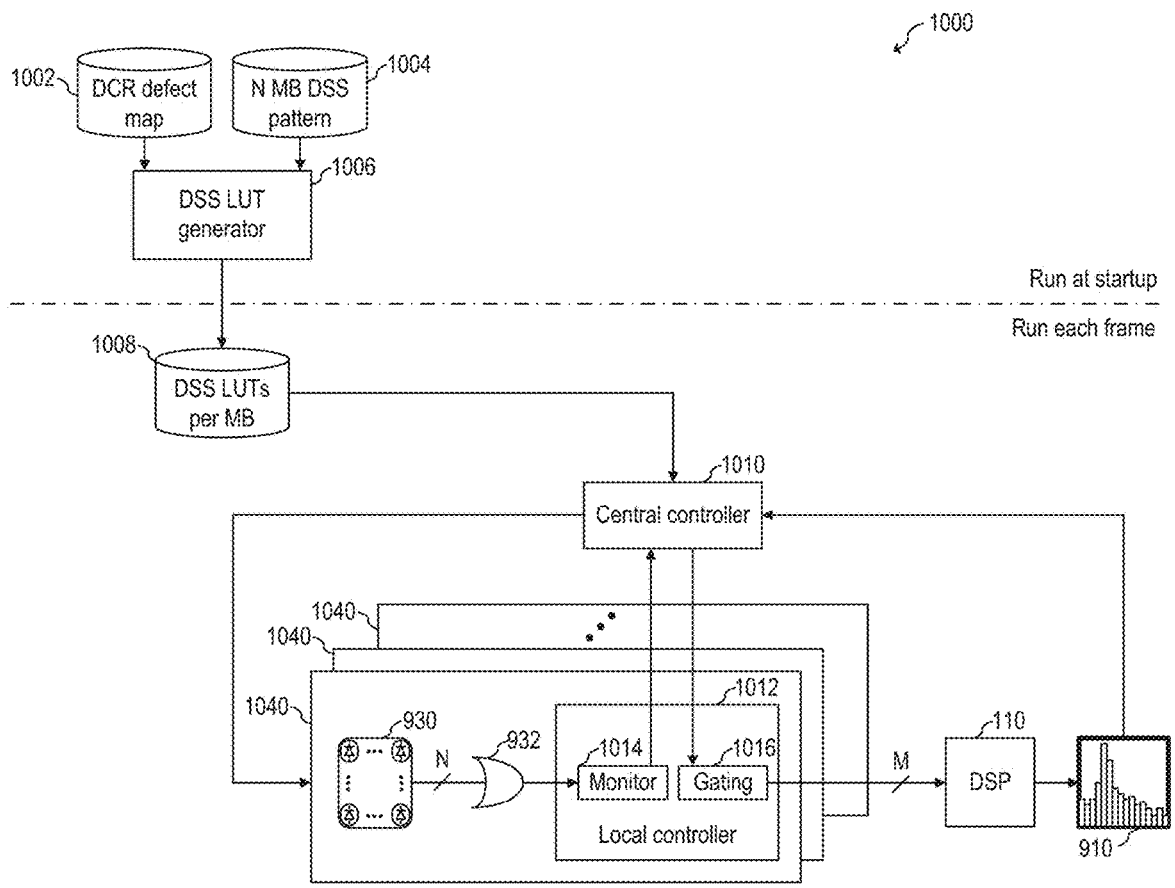
FIG. 10 shows a schematic diagram of a ranging circuit showing a possible implementation of the controller of FIG. 9, according to an embodiment of the present invention.

FIG. 10 shows a schematic diagram of ranging circuit 1000 showing a possible implementation of controller 902, according to an embodiment of the present invention. Controller 902 includes central controller 1010, and M local controllers 1012. Each local controller 1012 includes monitor circuit 1013 and gating circuit 1016. In some embodiments, controller 902 also performs the operations associated with elements 1002, 1004, 1006, and 1008.

During startup of ranging circuit 1000, dark counter read (DCR) defect map generator 1002 generates a DCR map to identify malfunctioning SPADs in the SPAD array (where the SPAD array includes M SPAD clusters 930). MB DSS pattern generator 1004 generates (e.g., N) patterns to be used when a particular number of SPADs are to be enabled per SPAD cluster 930 (e.g., where N is the number of SPADs in each SPAD cluster 930). For example, if 4 SPADs are to be enabled per cluster 930, MB DSS pattern generator 1004 generates a pattern that enables 4 SPADs, e.g., that are distributed in the SPAD cluster 930.

DSS look-up table (LUT) generator 1006 generates a LUT per SPAD MB indicating the SPAD pattern (which SPADs are to be turned on) based on the number of SPADs desired to be turned on. For example, with respect to SPAD array 400, the DSS LUT for a SPAD pattern of 1 (1 SPAD enabled) may look, e.g., as shown in FIG. 7A. As another example, with respect to SPAD array 400, the DSS LUT for a SPAD pattern of 4 (4 SPADs enabled) may look, e.g., as shown in FIG. 8A.

The DSS LUTs generated by DSS LUT generator 1006 may take into consideration defective SPADs. For example, a SPAD pattern of 4 may look different in a SPAD cluster 930 having a defective SPAD since such SPAD cluster 930 would turn on a different SPAD so that it has 4 SPADs on.

The DSS LUTs are stored in DSS LUT circuit 1008 (which may be, e.g., a volatile or non-volatile memory).

After startup, ranging device 1000 generates timing measurements, arranged in frames, based on the output of the OR trees 932. During each frame, central controller 1010 may determine the number of SPADs to be enabled for each SPAD cluster 930 to avoid saturation of OR tree 932 while maximizing the number of active SPADs per SPAD cluster 930 (e.g., by performing DSS). Which SPADs are enabled in each SPAD cluster 930 is based on the DSS patterns stored in DSS LUT circuit 1008.

Local controller 1012 monitors the number of events generated by the respective OR tree 932 using monitor circuit 1014. Local controller 1012 reports the number of events to central controller 1010.

Central controller 1010 receives information from monitor circuit 1014 of each SPAD MB 1040 and determines whether one or more SPAD MBs 1040 are generating events that, e.g., are detrimental to the performance of ranging device 1000. For example, central controller 1010 may determine that a particular SPAD MB 1040 is generating a disproportionate number of ambient events (e.g., because it is exposed to an intense and localized light source) based on the outputs of one or more monitor circuits 1014. Central controller 1010 then may gate (block) the output of one or more SPAD MBs 1040 that central controller 1010 determined were detrimental to the performance of ranging device 1000 (such as SPAD clusters 802 and 804 in the embodiment of FIGS. 8A and 8B).

Once central controller 1010 determines which SPAD MB 1040 to block, central controller 1010 gates the output of the OR tree 932 of the blocked SPAD MB 1040 using the corresponding gating circuit 1016.

In some embodiments, monitor circuit 1014 continues to monitor the output of OR tree 932 even though gating circuit 1016 may be preventing such output from contributing to the generation of histogram 910. In some embodiments, central controller 1010 may unblock a blocked SPAD MB 1014 based on the output of the corresponding monitor circuit 1014 (e.g., when the intense and localize light source is removed).

Figure 11:
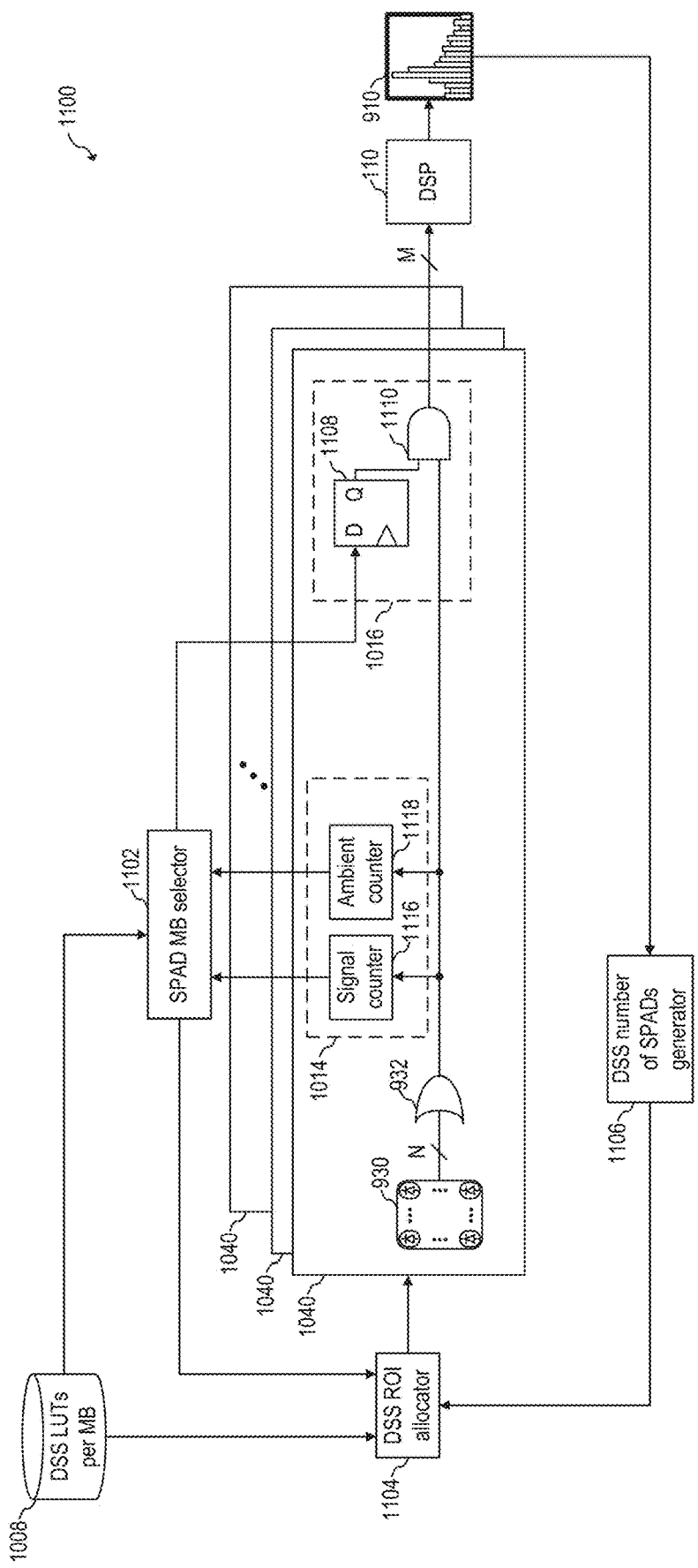
FIG. 11 shows a schematic diagram of a ranging circuit showing a possible implementation of the controllers of FIG. 10, according to an embodiment of the present invention.

FIG. 11 shows a schematic diagram of ranging circuit 1100 showing a possible implementation of controllers 1010 and 1012, according to an embodiment of the present invention. Central controller 1010 includes SPAD MB selector 1102, DSS ROI allocator 1104, and DSS number of SPADs generator 1106. Local controller 1012 includes monitor circuit 1014 and gating circuit 1016. Monitor circuit 1014 includes signal counter 1116 and ambient counter 1118. Gating circuit 1016 includes D-flip-flop 1108 and AND gate 1110.

During normal operation, signal counter 1116 counts the number of events generated by OR tree 932 that are associated to a signal (e.g., from a target in the FoV of ranging circuit 1100) and ambient counter 1118 counts the number of events generated by OR tree 932 that are associated to ambient light (e.g., when illuminator 106 is not illuminating the FoV of ranging circuit 1100). The count signal generated by signal counter may also include events generated by ambient light).

SPAD MB selector 1102 receives the number of events from counters 1116 and 1118 of each SPAD MB 1040 and determines whether to gate the output of one or more SPAD MBs 1040. When SPAD MB selector 1102 determines that the output of a particular SPAD MB 1040 should be blocked (gated), SPAD MB selector 1102 causes the D-flip-flop 1108 of such SPAD MB 1040 to clock in a "o" so that the corresponding Q output is "0," thereby causing the output of AND gate 1110 to be "o" (regardless of the state of the output of OR tree 932).

DSS number of SPADs generator determines, e.g., based on histogram 910, the total number of SPADs (e.g., from the SPADs in the ROI) that should contributes to the generation of histogram 910 to maximize the dynamic range of histogram 910 without saturating OR tree 932.

DSS ROI allocator 1104 determines which SPADs to turn on in each SPAD MB 1040 based on the total number of SPADs that should contribute to the generation of histogram 910 (from DSS number of SPAD generator 1106), on whether one or more SPAD MBs 1040 are prevented from contributing to the generation of histogram 910 (from SPAD MB selector 1102) and on the LUTs (from DSS LUT circuit 1008). For example, if DSS number of SPAD generator 1106 determines that 56 SPADs should contribute to the generation of histogram 910, and DSS ROI allocator receives information from SPAD MB selector 1102 that two SPAD MBs 1040 are disabled, then DSS ROI allocator enables 4 SPADs per SPAD MB 1040 (e.g., as shown in FIG. 8A, for example).

In some embodiments, although the output of a particular SPAD MB 1040 may be gated by gating circuit 1016, counters 1116 and 1118 may continue to report the number of events generated by the corresponding SPAD cluster 930 to SPAD MB selector 1102, e.g., so that SPAD MB selector 1102 may re-enable the blocked SPAD MB 1040, e.g., if it becomes desirable to do so (e.g., in the next frame).

In some embodiments, SPAD MB selector 1102 performs DSS for gated SPAD MBs 1040 (via DSS ROI allocator 1104) to prevent saturation of their respective OR trees 932.

Counter 1116 and 1118 may be implemented in any way known in the art. For example, in some embodiments, counter 1116 and 1118 is implemented as a digital counter.

In some embodiments, counters 1116 and 1118 may be implemented by a single digital counter. For example, in some embodiments, the single digital counter may produce a signal count, associated with reflected radiation pulses, during $8/9^{th}$ of a frame (e.g., when illumination source 106 is pulsing). Such signal count may be stored or transmitted to SPAD MB 1102. The single digital counter may then be reset, and the single digital counter may count for the remaining $1/9^{th}$ of the frame an ambient count (e.g., when illumination source 106 is not pulsing). Such ambient count may be stored or transmitted to SPAD MB 1102. The single digital counter may then be reset to count the signal count during the next frame.

In some embodiments, signal counter 1116 counts events during a first portion of time of a frame, such as $8/9^{th}$ of a frame, where the illuminator 106 is illuminating the FoV of ranging circuit 1100. In some embodiments, ambient counter 1118 counts events during a second portion of time of a frame, such as $1/9^{th}$ of a frame, where the illuminator 106 is not illuminating the FoV of ranging circuit 1100 (e.g., when illuminator 106 is off). Other durations of the first and second time portions may be used. The first time portion may occur at the beginning of the frame, or at a different time (e.g., at the end of the frame). The second time portion may occur at the end of the frame, or at a different time (e.g., at the beginning of the frame).

In some embodiments, the total number of events received during the frame (signal events+ambient events) may be approximated by multiplying the signal count (the count of counter 1116) times the inverse of the fractional duration of the first time portion (e.g., $\%^{th}$). In other embodiments, the total number of events received during the frame may be simply approximated as the signal count (the count of counter 1116).

In some embodiments, the total number of events associated to the ambient level received during the frame may be approximated by multiplying the ambient count (the count of counter 1118) times the inverse of the fractional duration of the second time portion (e.g., 9).

As mentioned before, in some embodiments, the number of events associated with the signal counter includes contributions from ambient light. Therefore, the actual number of events associated to the signal (e.g., from a target and without ambient light contributions) may be approximated as the total number of events (e.g., based on counter 1116) minus the ambient number of events (based on counter 1118).

Although FIG. 11 shows gating circuit 1016 implemented with a D-flip-flop 1108 and an AND gate 1110, it is understood that gating circuit 1016 may be implemented with alternative logic circuits, such as other types of logic gates and/or other types of flip-flops, for example.

Figure 12:
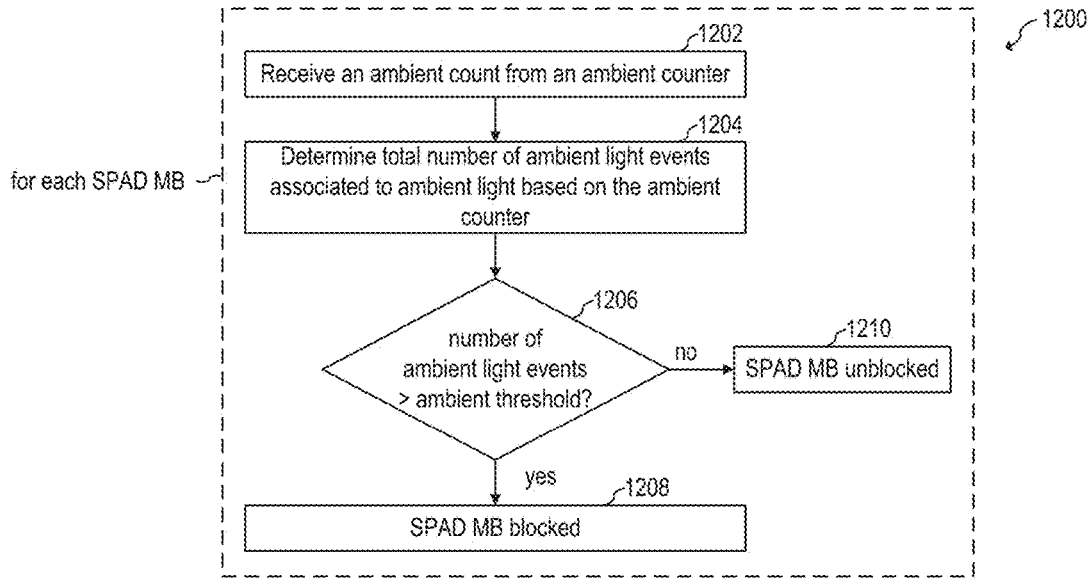
FIGS. 12-14 show flow charts of embodiment methods of determining whether to block an output of a SPAD macroblock (MB), according to an embodiments of the present invention.

FIG. 12 shows a flow chart of embodiment method 1200 of determining whether to block an output of a SPAD MB 1040, according to an embodiment of the present invention. Method 1200 may be implemented by, e.g., ranging circuits 900, 1000, and 1100.

During step 1202, an ambient count of an ambient counter (e.g., counter 1118) configured to count the number of events associated with ambient light is received. The ambient counter may be configured to count the number of events from a SPAD cluster (e.g., 930) when, e.g., the VCSEL (e.g., 106) is off.

In some embodiments, the ambient count may be determined each frame. Since the illuminator 106 may be pulsing (on) at least during a portion of the frame, there may be a limited time to determine the ambient count (when the illuminator 106 is off). In some embodiments, the ambient counter may only count the number of events during a small fraction of the duration of the frame, such as 15% of the duration of the frame, or less, such as $\frac{1}{9}^{th}$ of the duration of the frame.

During step 1204, the total number of ambient light events generated during the frame is determined/estimated. For example, if ambient counter counts events during $\frac{1}{9}^{th}$ the time of the frame, the ambient count may be multiplied times 9, and the result may be used as the approximate number of ambient light events generated during the frame.

During step 1206, if it is determined that the number of ambient light events during the frame is higher than an ambient light threshold, the SPAD MB is prevented (blocked) from contributing to the generation of the histogram (e.g., 910) during step 1208 (e.g., by using gating circuit 1016). If the number of ambient light events during the frame is lower than the ambient light threshold, the SPAD MB is allowed to contribute to the generation of the histogram during step 1210 (e.g., by keeping the SPAD MB enabled or re-enabling the SPAD MB).

In some embodiments, since reaching a determination during step 1206 may occur at or near the end of a frame, the action taken (e.g., either to block or not to block a SPAD MB) may take effect during the next frame). In some embodiments, events from several frames are accumulated during an integration time (e.g., 15 ms), and the desired blocking is/are calculated based on such accumulated events.

In some embodiments, method 1200 is performed for each SPAD MB 1040 during each frame (e.g., regardless of whether the output of the particular SPAD MB 1040 is blocked). If, during step 1206, it is determined that a blocked SPAD MB has a number of ambient light events lower than the ambient light threshold, such blocked SPAD MB may be unblocked during step 1210, and be allowed to contribute to the generation of the histogram.

In some embodiments, step 1204 may be omitted and step 1206 may perform the comparison directly using the ambient count from the ambient counter (e.g., where the ambient threshold used is a scaled version of the ambient threshold used if step 1204 is performed).

Some embodiments implementing method 1200 may avoid implementing signal counter 1116.

Figure 13:
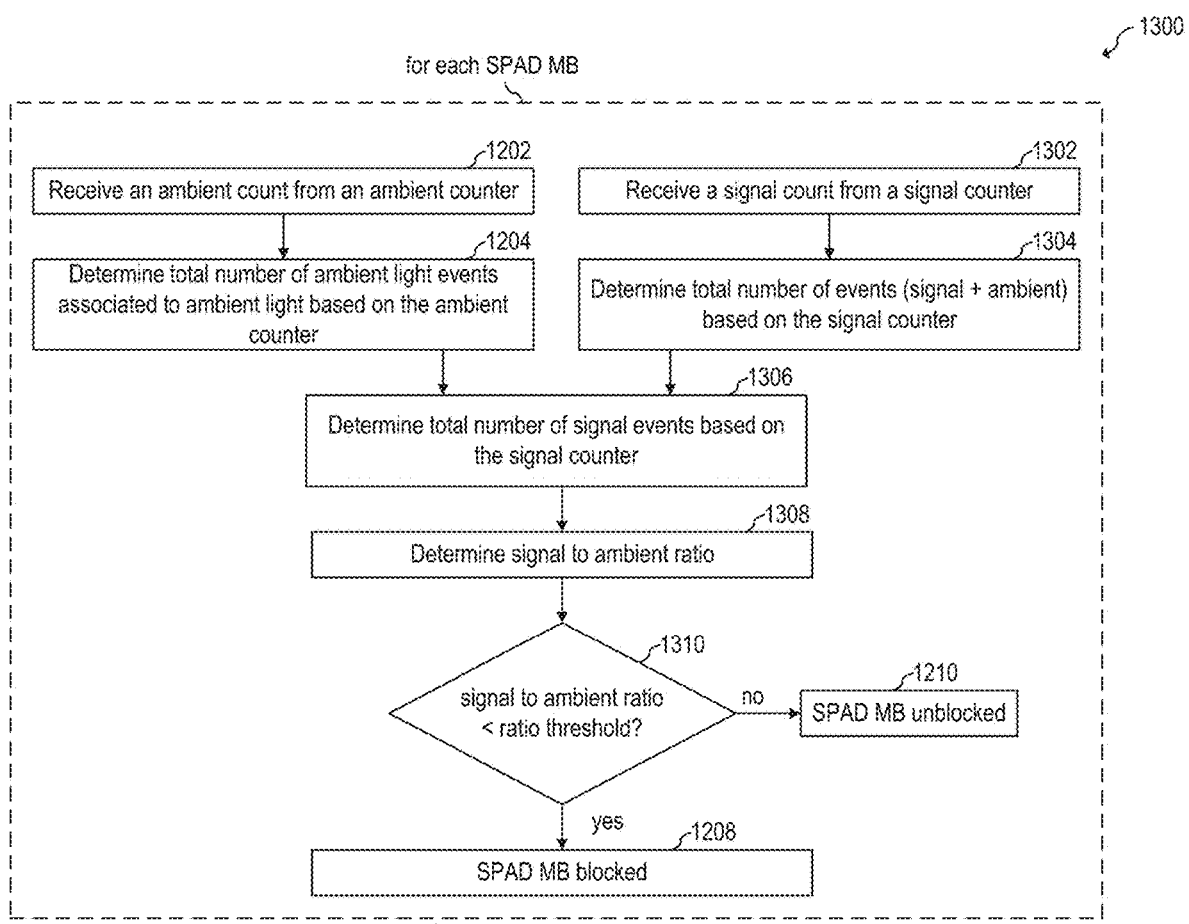

FIG. 13 shows a flow chart of embodiment method 1300 of determining whether to block an output of a SPAD MB 1040, according to an embodiment of the present invention. Method 1300 may be implemented by, e.g., ranging circuits 900, 1000, and 1100.

Steps 1202, 1204, 1208 and 1210 may be performed, e.g., as described with respect to FIG. 12.

During step 1302, a signal count of a signal counter (e.g., counter 1116) configured to count the number of events associated with a signal reflected from a target in the FoV of the ranging circuit (e.g., 1100) is received. The signal counter may be configured to count the number of events from a SPAD cluster (e.g., 930) when, e.g., the VCSEL (e.g., 106) is pulsing (on).

In some embodiments, the signal count may be determined each frame. Since the illuminator 106 may stop pulsing for at least during a portion of the frame (e.g., to allow for step 1202 to be performed), the signal counter only counts the number of events during a fraction of the duration of the frame, such as 85% of the duration of the frame, or higher, such as $\%^{th}$ of the duration of the frame. Other durations are also possible.

As mentioned before, the signal count may include events associated with ambient light. During step 1304, the total number of events (signal+ambient) received during the frame may be determined based on the signal count. For example, in some embodiments, the total number of events may be determined by multiplying the signal count times the inverse of the fractional duration of the time portion in which the events where captured (e.g., $\%^{th}$). In other embodiments, the total number of events associated to the signal may be simply approximated as the signal count.

During step 1306, the total number of signal events is determined, e.g., by subtracting the total number of events (e.g., from step 1304) minus the total number of ambient events (e.g., from step 1204). In some embodiments, steps 1204 and 1304 may be omitted and the total number of signal events may be determined, e.g., based directly from the ambient count (e.g., from step 1202) and the signal count (e.g., from step 1302).

During step 1308, the signal to ambient ratio is determined, e.g., by diving the total number of signal events (e.g., from step 1306) over the total number of ambient events (e.g., from step 1204). In some embodiments, steps 1204, 1304 and 1306 may be omitted and the signal to ambient ratio may be determined directed from the ambient count (e.g., from step 1202) and the signal count (e.g., from step 1302).

During step 1310, if it is determined that the signal to ambient ratio is lower than a ratio threshold, the SPAD MB is prevented (blocked) from contributing to the generation of the histogram (e.g., 910) during step 1208 (e.g., by using gating circuit 1016). If it is determined that the signal to ambient ratio is higher than the ratio threshold, the SPAD MB is allowed to contribute to the generation of the histogram during step 1210.

Figure 14:
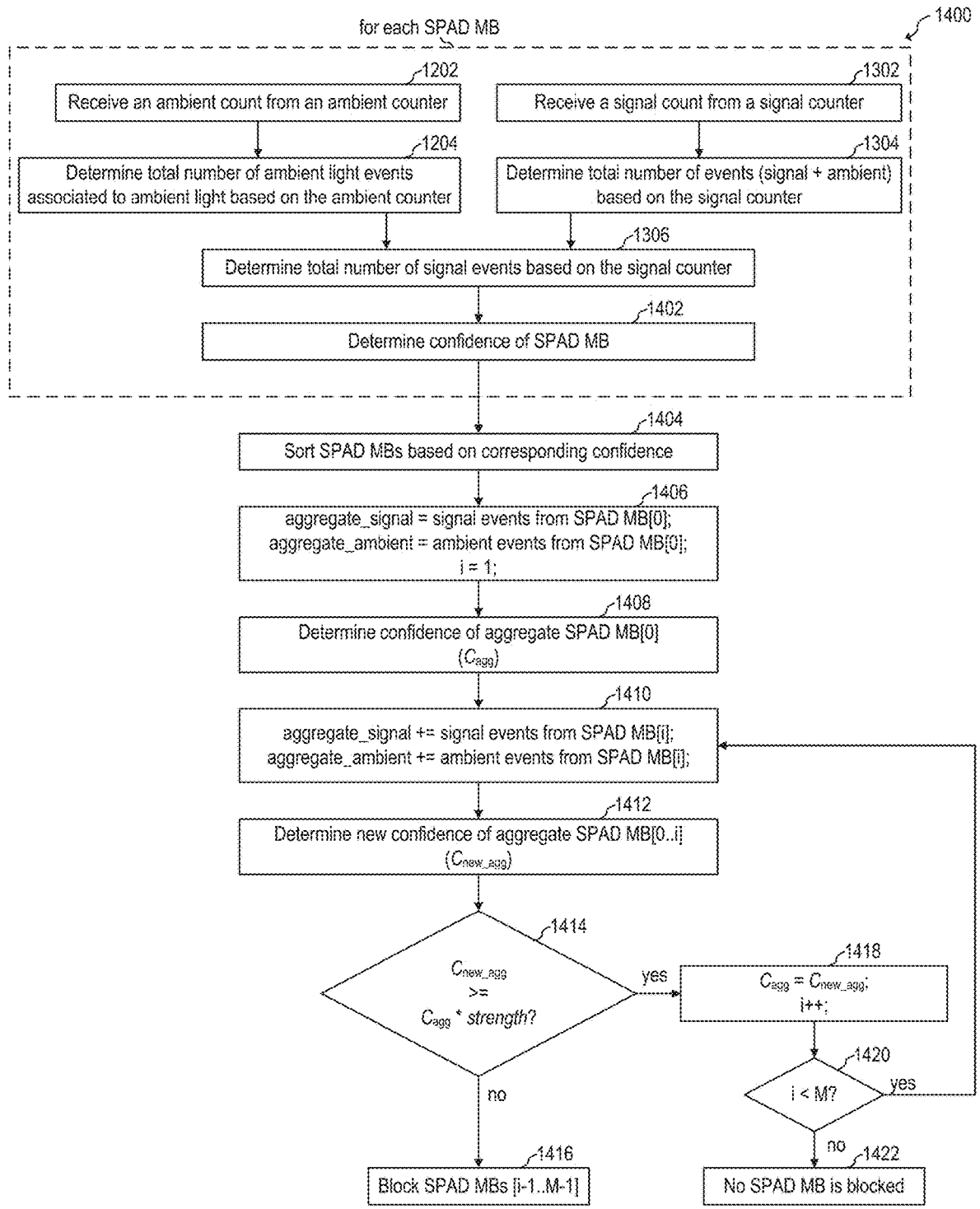
Figure 15:
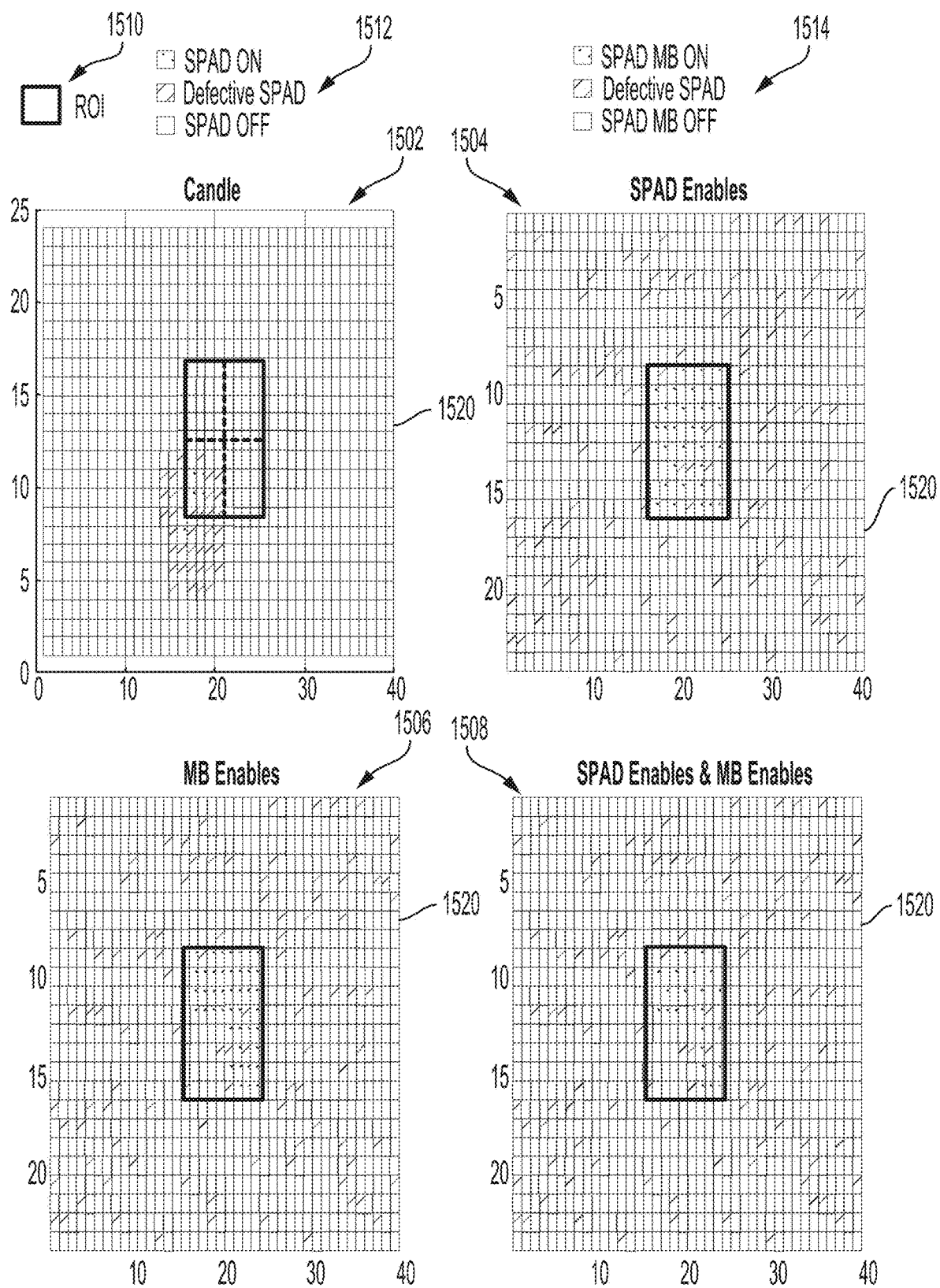
FIGS. 15-18 show SPAD maps of simulation results implementing the method of FIG. 14 in the presence of a candle, according to an embodiment of the present invention.
Figure 16:
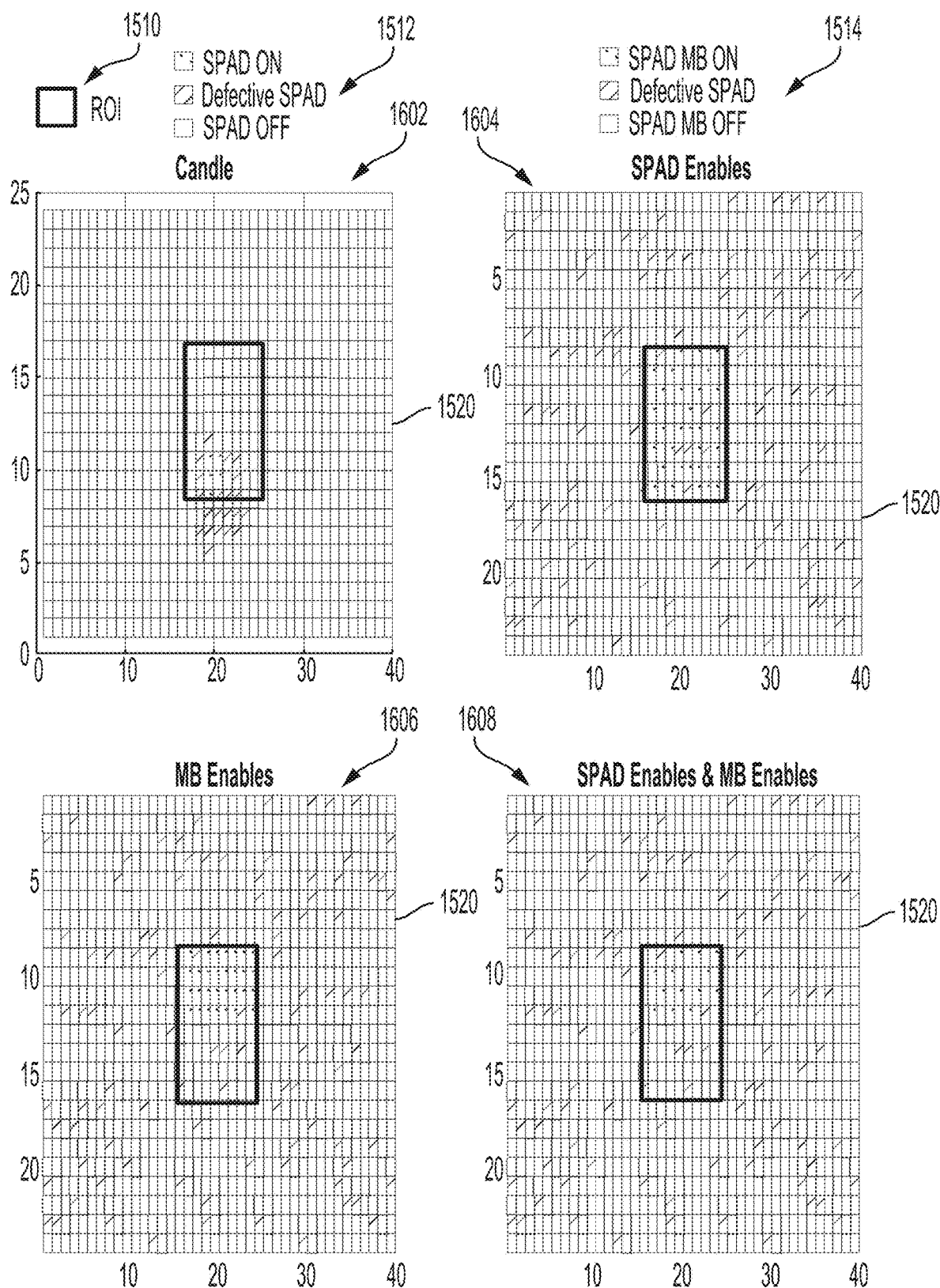
Figure 17:
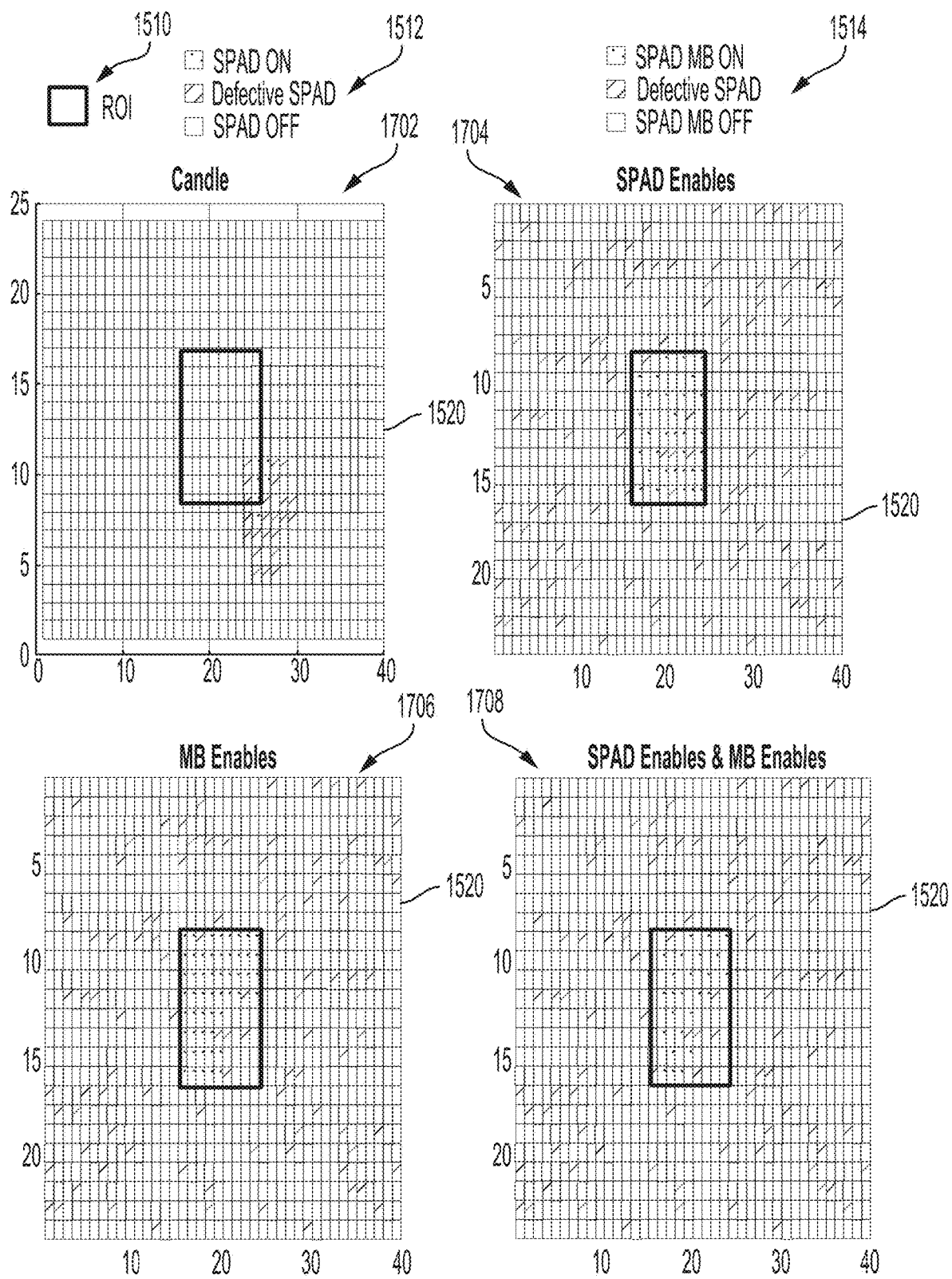
Figure 18:
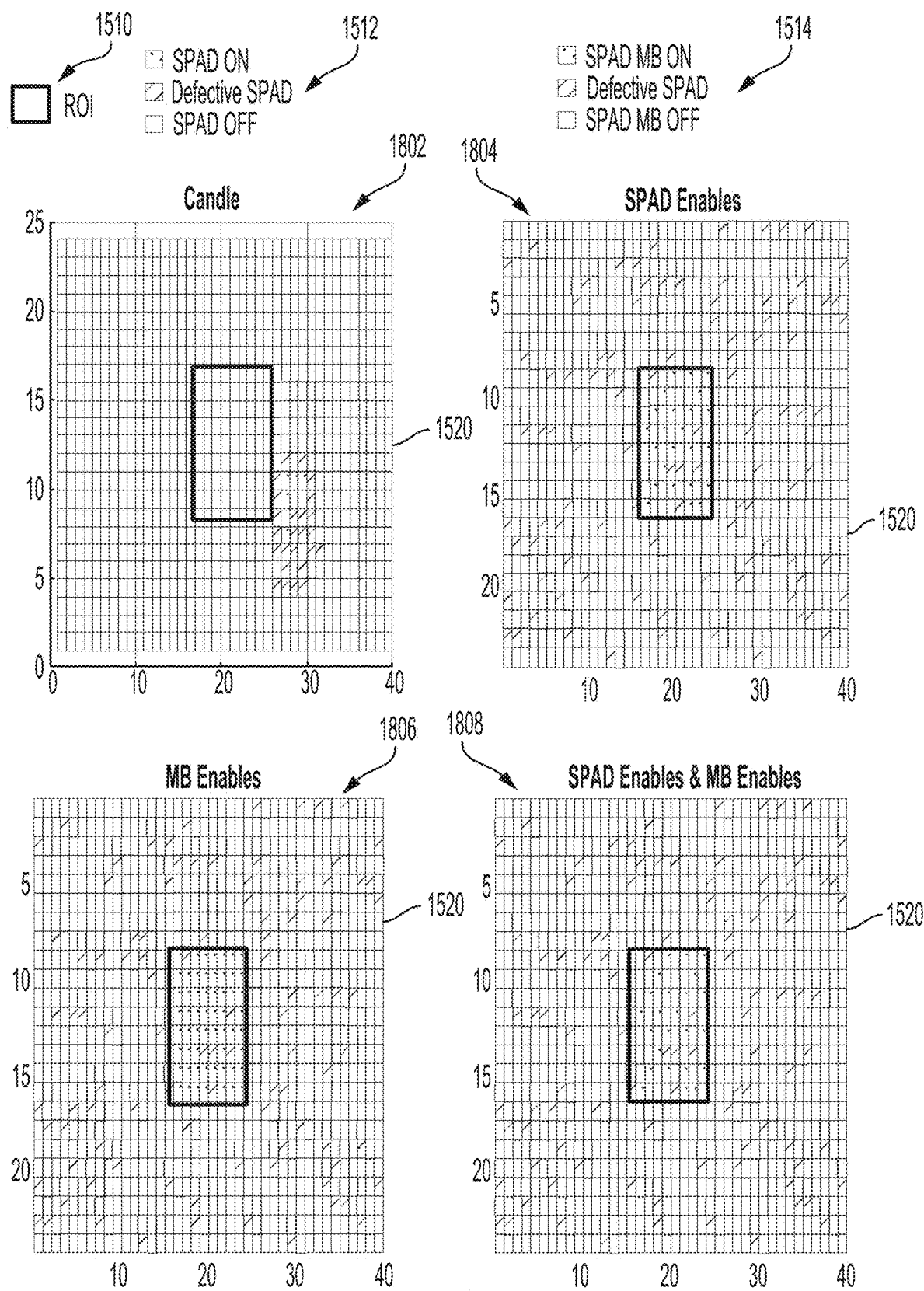

FIG. 14 shows a flow chart of embodiment method 1400 of determining whether to block an output of a SPAD MB 1040, according to an embodiment of the present invention. Method 1400 may be implemented by, e.g., ranging circuits 900, 1000, and 1100.

Steps 1202, 1204, 1302, 1304, and 1306 may be performed, e.g., as described with respect to FIGS. 12 and 13.

During step 1402, a confidence value C of the SPAD MB is determined, e.g., by $$C = \frac{S - W \cdot \sqrt{S}}{A} \quad (1)$$

where S is the total number of signal events (e.g., from step 1306), A is the total number of ambient events (e.g., from step 1204), and W is a factor that may be, e.g., from 1 (or lower) to 6 (or higher). In some embodiments, the higher the factor W, the higher the signal to ambient ratio associated with the contributions of such SPAD MB to the histogram (e.g., 910).

Once step 1402 is performed for all M SPAD MBs, the SPAD MBs are sorted, during step 1404, based on their respective confidence value C[i], where C[0] corresponds to the SPAD MB with the highest confidence value, and C[M−1] corresponds to the SPAD MB with the lowest confidence value.

During step 1406, the variables i, aggregate signal, and aggregate ambient are initialized to correspond to the SPAD MB[0], which has the highest confidence value C[0].

During step 1408, a variable $C_{agg}$, representing the confidence value of the aggregate of all SPAD MBs (only including SPAD MB[0] at this point) is initialized as equal to confidence value C[0].

During step 1410, a new set of SPAD MBs that include SPAD MBs 0 to i, is generated and the total number of signal events of all SPAD MBs 0 to i are aggregated into the variable aggregate_signal, and the total number of ambient events of all SPAD MBs 0 to i are aggregated into the variable aggregate_ambient.

During step 1412, a new confidence value $C_{new\_agg}$ of the new set of SPAD MBs (from 0 to i) is generated, e.g., using Equation 1.

During step 1414, a determination is made as to whether the new confidence value $C_{new\_agg}$ (associated to SPAD MBs 0 to i) is higher than or equal to the confidence value $C_{new}$ (associated to SPAD MBs 0 to i−1) times a strength variable, where the strength variable is a value from 0 to 1, inclusive. If step 1414 returns no, then adding the additional SPAD MB i, and any additional SPAD MBs i+1 to M−1 (since the SPAD MBs are sorted) would cause the confidence value to degrade and therefore, SPAD MBs i−1 to M−1 are blocked (e.g., using gating circuit 1016).

If step 1416 returns yes, then the SPAD MB is included in the set of aggregate SPAD MBs, the index i is incremented, and confidence value $C_{agg}$ is updated with the confidence value $C_{new\_agg}$ of the new set of aggregate SPAD MBs during step 1418.

During step 1420, if index i is not lower than M, then all of the SPAD MBs have been considered, and no SPAD MB is blocked during step 1422. If index i is lower than M, step 1410 is repeated with the updated index i.

FIG. 15-18 show SPAD maps of simulation results implementing method 1400 in the presence of candle 704, according to an embodiment of the present invention. Legend 1510 applies to SPAD maps 1502, 1504, 1506, 1508, 1602, 1604, 1606, 1608, 1702, 1704, 1706, 1708, 1802, 1804, 1806, and 1808. Legend 1512 applies to SPAD maps 1504, 1508, 1604, 1608, 1704, 1708, 1804, and 1808. Legend 1514 applies to SPAD maps 1506, 1606, 1706, and 1806. As shown in FIGS. 15-18, the SPAD array 1520 has 23 rows and 39 columns of SPADs for a total of 897 SPADs. The ROI is divided into 4 SPAD MBs, as shown in SPAD map 1502.

As shown in SPAD map 1502, candle 702 excites SPADs in the lower left quadrant of the ROI of SPAD array 1520. SPAD map 1504 shows all SPAD MBs in the ROI enabled (before method 1400 is performed). SPAD map 1506 shows that, after performing method 1400, the SPAD MB at the lower left quadrant is blocked. SPAD map 1508 shows that the SPADs at the top two quadrants and at the bottom right quadrant are enabled and contributing to the generation of histogram 910 after method 1400 is performed.

As shown in SPAD map 1602, candle 702 excites SPADs in the lower two quadrant of the ROI of SPAD array 1520. SPAD map 1604 shows all SPAD MBs in the ROI enabled (before method 1400 is performed). SPAD map 1606 shows that, after performing method 1400, the SPAD MB at the lower two quadrants are blocked. SPAD map 1608 shows that the SPADs at the top two quadrants are enabled and contributing to the generation of histogram 910 after method 1400 is performed.

As shown in SPAD map 1702, candle 702 excites SPADs in the lower right quadrant of the ROI of SPAD array 1520. SPAD map 1704 shows all SPAD MBs in the ROI enabled (before method 1400 is performed). SPAD map 1706 shows that, after performing method 1400, the SPAD MB at the lower right quadrant is blocked. SPAD map 1708 shows that the SPADs at the top two quadrants and at the lower left quadrant are enabled and contributing to the generation of histogram 910 after method 1400 is performed.

As shown in SPAD map 1802, candle 702 does not excite any SPADs in the ROI of SPAD array 1520. SPAD map 1804 shows all SPAD MBs in the ROI enabled (before method 1400 is performed). SPAD map 1806 shows that, after performing method 1400, none of the SPAD MBs are blocked. SPAD map 1808 shows that the SPADs in all quadrants are enabled and contributing to the generation of histogram 910 after method 1400 is performed.

Figure 19:
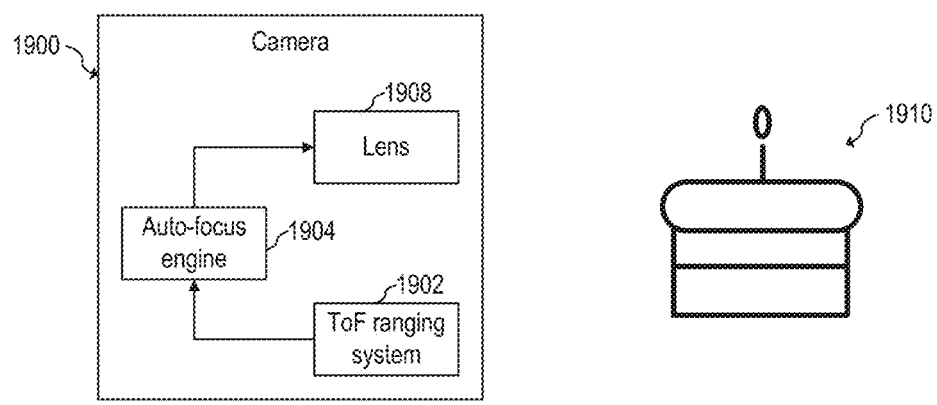
FIG. 19 shows a camera with auto-focus, according to an embodiment of the present invention.

FIG. 19 shows camera 1900 with auto-focus, according to an embodiment of the present invention. Camera 1900 includes lens 1908, auto-focus engine 1904, and ToF ranging system 1902. ToF ranging system 1902 may be implemented, e.g., as shown and described with respect to FIG. 1, includes a ranging circuit according to embodiments of the present invention, such as ranging circuits 900, 1000, and 1100, and implements methods of determining whether to block an output of a SPAD MB according to embodiments of the present invention, such as methods 1200, 1300, and 1400.

During normal operations, ToF ranging system determines the distance to target 1910 using, for example, one of methods 1200, 1300, or 1400. ToF ranging system 1902 transmits distance information based on the generated histogram (e.g., 930) to auto-focus engine 1904, which adjusts lens 1908 to have a focal point based on the information received from ToF ranging system 1902.

Target 1910 may be a target with an intense and localize light source, such as a candle, a light bulb, a window behind a person, etc. Target 1910 may also be a target without an intense and localized light source.

Auto-focus engine 1904 and lens 1908 may be implemented in any way known in the art.

Advantages of some embodiments include increasing the signal to ambient light ratio and the performance of the ranging device in the presence of an intense and localized light source. Additional advantages of some embodiments include enabling ranging to longer distances with better repeatability in structured high ambient light scenarios.

Example embodiments of the present invention are summarized here. Other embodiments can also be understood from the entirety of the specification and the claims filed herein.

Example 1. A method for operating a time-of-flight (ToF) ranging array, the method including: illuminating a field-of-view (FoV) of the ToF ranging array with radiation pulses; receiving reflected radiation pulses with a plurality of single photon avalanche diodes (SPADs) in a region of interest (ROI) of the ToF ranging array, the plurality of SPADs arranged in a plurality of SPAD clusters; determining an ambient count of ambient light events generated by SPADs of a first SPAD cluster of the plurality of SPAD clusters; and gating an output of the first SPAD cluster based on the ambient count.

Example 2. The method of example 1, further including counting events generated by an OR tree coupled to the SPADs of the first SPAD cluster to determine the ambient count.

Example 3. The method of one of examples 1 or 2, further including stopping illuminating the FoV of the ToF ranging array, where determining the ambient count includes counting events generated by SPADs of the first SPAD cluster after stopping illuminating the FoV of the ToF ranging array.

Example 4. The method of one of examples 1 to 3, where gating the output of the first SPAD cluster includes gating the output of the first SPAD cluster when the ambient count is higher than an ambient threshold.

Example 5. The method of one of examples 1 to 4, further including determining a signal count of events associated with the reflected radiation pulses by monitoring events generated by SPADs of the first SPAD cluster, where gating the output of the first SPAD cluster is further based on the signal count.

Example 6. The method of one of examples 1 to 5, further including determining a signal to ambient ratio based on the signal count and the ambient count, where gating the output of the first SPAD cluster includes gating the output of the first SPAD cluster when the signal to ambient ratio is lower than a ratio threshold.

Example 7. The method of one of examples 1 to 6, further including determining a confidence value based on the signal count and the ambient count by $$C = \frac{S - W \cdot \sqrt{S}}{A},$$

where C is the confidence value, S is the signal count, A is the ambient count, and W is a number between 0 and 1, inclusive, where gating the output of the first SPAD cluster includes gating the output of the first SPAD cluster when the confidence value is lower than a confidence threshold.

Example 8. The method of one of examples 1 to 7, where the confidence threshold is based on a second confidence value associated with a second SPAD cluster of the plurality of SPAD clusters.

Example 9. The method of one of examples 1 to 8, further including: determining a respective confidence value of each SPAD cluster of the plurality of SPAD clusters based on ambient and signal counts of the respective SPAD cluster, where determining the respective confidence value includes determining the confidence value of the first and second SPAD clusters; sorting the plurality of SPAD clusters in a sorted order based on respective confidence values of each SPAD cluster of the plurality of SPAD clusters; and determining, sequentially in the sorted order, whether to gate an output of each SPAD cluster.

Example 10. The method of one of examples 1 to 9, where the confidence threshold is based on a second confidence value associated with a plurality of SPAD clusters of the plurality of SPAD clusters.

Example 11. The method of one of examples 1 to 10, where the confidence threshold is equal to the second confidence value times a strength value, where the strength value is a number between 0 and 1, inclusive.

Example 12. The method of one of examples 1 to 11, further including monitoring events generated by SPADs of the first SPAD cluster after gating the output of the first SPAD cluster.

Example 13. The method of one of examples 1 to 12, where gating the output of the first SPAD cluster includes turning off the first SPAD cluster.

Example 14. The method of one of examples 1 to 13, where gating the output of the first SPAD cluster includes changing a state of a flip-flop.

Example 15. The method of one of examples 1 to 14, where illuminating the FoV of the ToF ranging array includes using a vertical-cavity surface-emitting laser (VCSEL).

Example 16. A ranging circuit including: a plurality of single photon avalanche diode (SPAD) macro-blocks (MBs), each SPAD MB including a respective SPAD cluster and a respective OR tree; a controller coupled to an output of the respective OR tree of each SPAD MB of the plurality of SPAD MBs; and a processor configured to generate a histogram based on an output of one or more SPAD MBs of the plurality of SPAD MBs, where the controller is configured to: determine an ambient count of ambient light events generated by SPADs of a first SPAD cluster of a first SPAD MB of the plurality of SPAD MBs; and gate an output of the first SPAD MB based on the ambient count.

Example 17. The ranging circuit of example 16, where the first SPAD MB includes a local controller including: a monitor circuit coupled to the output of the respective OR tree and configured to monitor events generated by the first SPAD cluster; and a gate circuit coupled to the output of the respective OR tree and configured to, when enabled, prevent the output of the respective OR tree to propagate to the output of the first SPAD MB, where the controller includes the local controller.

Example 18. The ranging circuit of one of examples 16 or 17, where the monitor circuit includes a digital counter coupled to the output of the respective OR tree, the digital counter configured to generate the ambient count.

Example 19. The ranging circuit of one of examples 16 to 18, where the monitor circuit further includes a second digital counter coupled to the output of the respective OR tree, where the second digital counter is configured to generate a signal count, and where the controller is configured to gate the output of the first SPAD MB based on the ambient count and on the signal count.

Example 20. The ranging circuit of one of examples 16 to 19, where the controller includes a plurality of local controllers, each local controller of the plurality of local controllers being included in a corresponding SPAD MB of the plurality of SPAD MBs, where each local controller includes: a respective monitor circuit coupled to the output of the respective OR tree and configured to monitor events generated by the respective SPAD cluster; and a respective gate circuit coupled to the output of the respective OR tree and configured to, when enabled, prevent the output of the respective OR tree to propagate to the output of the respective SPAD MB.

Example 21. The ranging circuit of one of examples 16 to 20, where each gate circuit includes a respective flip-flop and a respective AND gate having a first input coupled to an output of the respective flip-flop, and a second input coupled to an output of the respective OR tree, where the respective gate circuit is selectively enabled by changing a state of the respective flip-flop.

Example 22. The ranging circuit of one of examples 16 to 21, where the processor includes a portion of the controller.

Example 23. A device including: an illuminator circuit configured to illuminate a field-of-view (FoV) of the device with radiation pulses; a time-of-flight (ToF) ranging array including a plurality of single photon avalanche diode (SPAD) macro-blocks (MBs), each SPAD MB including a respective SPAD cluster and a respective OR tree, the ToF ranging array configured to receive reflected radiation pulses; a controller coupled to an output of the respective OR tree of each SPAD MB of the plurality of SPAD MBs; and a processor configured to generate a histogram based on an output of the ToF ranging array, where the controller is configured to: determine an ambient count of ambient light events generated by SPADs of a first SPAD cluster of a first SPAD MB of the plurality of SPAD MBs; and gate an output of the first SPAD MB based on the ambient count.

Example 24. The device of example 23, further including: a lens; and an auto-focus engine, where the auto-focus engine is configured to adjust the lens based on histogram.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
receiving reflected radiation pulses with a plurality of single photon avalanche diodes (SPADs) in a region of interest of a time-of-flight (ToF) ranging array;
determining an ambient count of ambient light events generated by a SPAD cluster of a plurality of SPAD clusters; and
gating an output of the SPAD cluster based on the ambient count.

2. The method of claim 1, further comprising counting events generated by an OR tree coupled to the SPAD cluster to determine the ambient count.

3. The method of claim 1, wherein the determining the ambient count comprises counting events generated by the SPAD cluster after stopping illuminating the field of view of the ToF ranging array.

4. The method of claim 1, wherein the gating the output of the SPAD cluster comprises gating the output of the SPAD cluster in response to the ambient count being higher than an ambient threshold.

5. The method of claim 1, further comprising determining a signal count of events associated with the reflected radiation pulses by monitoring events generated by the SPAD cluster, wherein gating the output of the SPAD cluster is further based on the signal count.

6. The method of claim 5, further comprising determining a signal to ambient ratio based on the signal count and the ambient count, wherein gating the output of the SPAD cluster comprises gating the output of the SPAD cluster in response to the signal to ambient ratio being lower than a ratio threshold.

7. The method of claim 5, further comprising determining a confidence value based on the signal count and the ambient count using the equation, wherein C is the confidence value, S is the signal count, A is the ambient count, and W is a number between 0 and 1, inclusive, wherein gating the output of the SPAD cluster comprises gating the output of the SPAD cluster in response to the confidence value being lower than a confidence threshold.

8. A ranging circuit, comprising:
a plurality of single photon avalanche diodes (SPAD) configured to receive reflected radiation pulses in a region of interest of a time-of-flight (ToF) ranging array;
a non-transitory memory storage comprising instructions; and
a processor in communication with the non-transitory memory storage, wherein the processor executes the instructions to:
determine an ambient count of ambient light events generated by a SPAD cluster of a plurality of SPAD clusters; and
gate an output of the SPAD cluster based on the ambient count.

9. The ranging circuit of claim 8, further comprising a plurality of OR trees, wherein each OR tree is coupled to a respective SPAD cluster, the processor executes the instructions to count events generated by each respective OR tree to determine the ambient count.

10. The ranging circuit of claim 8, wherein the determining the ambient count comprises counting events generated by the SPAD cluster after stopping illuminating the field of view of the ToF ranging array.

11. The ranging circuit of claim 8, wherein the gating the output of the SPAD cluster comprises gating the output of the SPAD cluster in response to the ambient count being higher than an ambient threshold.

12. The ranging circuit of claim 8, wherein the processor executes the instructions to determine a signal count of events associated with the reflected radiation pulses by monitoring events generated by the SPAD cluster, wherein gating the output of the SPAD cluster is further based on the signal count.

13. The ranging circuit of claim 12, wherein the processor executes the instructions to determine a signal to ambient ratio based on the signal count and the ambient count, wherein gating the output of the SPAD cluster comprises gating the output of the SPAD cluster in response to the signal to ambient ratio being lower than a ratio threshold.

14. An optical device, comprising:
a time-of-flight (ToF) ranging array configured to illuminate a field-of-view (FoV) of the ToF ranging array with radiation pulses; and
a ranging circuit, comprising:
   a plurality of single photon avalanche diodes (SPAD) configured to receive reflected radiation pulses in a region of interest of the ToF ranging array,
   a non-transitory memory storage comprising instructions, and
   a processor in communication with the non-transitory memory storage, wherein the instructions, when executed by the processor, causes the processor to:
      determine an ambient count of ambient light events generated by a SPAD cluster of a plurality of SPAD clusters; and
      gate an output of the SPAD cluster based on the ambient count.

15. The optical device of claim 14, wherein the ranging circuit further comprises a plurality of OR trees, wherein each OR tree is coupled to a respective SPAD cluster, the processor executes the instructions to count events generated by each respective OR tree to determine the ambient count.

16. The optical device of claim 14, wherein the determining the ambient count comprises counting events generated by the SPAD cluster after stopping illuminating the FoV of the ToF ranging array.

17. The optical device of claim 14, wherein the gating the output of the SPAD cluster comprises gating the output of the SPAD cluster in response to the ambient count being higher than an ambient threshold.

18. The optical device of claim 14, wherein the processor executes the instructions to determine a signal count of events associated with the reflected radiation pulses by monitoring events generated by the SPAD cluster, and wherein gating the output of the SPAD cluster is further based on the signal count.

19. The optical device of claim 18, wherein the processor executes the instructions to determine a signal to ambient ratio based on the signal count and the ambient count, wherein gating the output of the SPAD cluster comprises gating the output of the SPAD cluster in response to the signal to ambient ratio being lower than a ratio threshold.

20. The optical device of claim 18, wherein the processor executes the instructions to determine a confidence value based on the signal count and the ambient count using the equation $$C = \frac{S - W \cdot \sqrt{S}}{A},$$

wherein C is the confidence value, S is the signal count, A is the ambient count, and W is a number between 0 and 1, inclusive, wherein gating the output of the SPAD cluster comprises gating the output of the SPAD cluster in response to the confidence value being lower than a confidence threshold.

* * * * *

UNITED STATES PATENT AND TRADEMARK OFFICE
CERTIFICATE OF CORRECTION

PATENT NO. : 11,885,878 B2
APPLICATION NO. : 17/952540
DATED : January 30, 2024
INVENTOR(S) : Stuart McLeod It is certified that error appears in the above-identified patent and that said Letters Patent is hereby corrected as shown below:

In the Claims

In Column 18, in Claim 7, Line 22, after "equation" delete "," and insert -- $C = \frac{S - W \cdot \sqrt{S}}{A}$ , --.

Signed and Sealed this
Twenty-third Day of April, 2024

Katherine Kelly Vidal
*Director of the United States Patent and Trademark Office*